US005835761A

United States Patent [19]
Ishii et al.

[11] Patent Number: 5,835,761
[45] Date of Patent: Nov. 10, 1998

[54] INFORMATION PROCESSING SYSTEM CAPABLE OF UPDATING A BIOS PROGRAMME WITHOUT INTERRUPTING OR STOPPING THE OPERATIONAL OF A SYSTEM

[75] Inventors: Masahiro Ishii; Toshikazu Yokoi; Kunio Takahari; Atsushi Toshima, all of Kamakura, Japan; Colin Hough; Nigel Bruce, both of Birmingham, United Kingdom

[73] Assignees: Mitsubishi Denki Kabushiki Kaisha, Tokyo, Japan; Apricot Computers Limited, Birmingham, United Kingdom

[21] Appl. No.: 895,529

[22] Filed: Jul. 17, 1997

Related U.S. Application Data

[63] Continuation of Ser. No. 363,690, Dec. 23, 1994, abandoned.

[30] Foreign Application Priority Data

Jun. 29, 1994 [GB] United Kingdom ............... 9413088

[51] Int. Cl.⁶ ........................................... G06F 9/45
[52] U.S. Cl. ................................. 395/653; 395/652
[58] Field of Search ........................... 395/651, 652, 395/653

[56] References Cited

U.S. PATENT DOCUMENTS

| | | |
|---|---|---|
| 5,101,490 | 3/1992 | Getson, Jr. et al. . |
| 5,113,497 | 5/1992 | Dewa ........................................ 395/700 |
| 5,230,052 | 7/1993 | Dayan et al. ............................. 395/700 |
| 5,355,489 | 10/1994 | Bealkowski et al. ..................... 395/700 |
| 5,388,267 | 2/1995 | Chan et al. ............................... 395/700 |
| 5,410,699 | 4/1995 | Bealkowski et al. ..................... 395/700 |

FOREIGN PATENT DOCUMENTS

| | | |
|---|---|---|
| 0476195 | 3/1992 | European Pat. Off. . |
| 0479427 | 4/1992 | European Pat. Off. . |
| 92-383304 | 11/1992 | European Pat. Off. . |
| 0524719 | 1/1993 | European Pat. Off. . |
| 4026911 | 2/1991 | Germany . |
| 4214184 | 11/1992 | Germany . |
| 3-156524 | 7/1991 | Japan ........................................ G06F 3/08 |
| 5-216639 | 8/1993 | Japan ........................................ G06F 9/06 |

OTHER PUBLICATIONS

Dipert et al., "Designing an updatable BIOS using flash memory," Microprocessors and Microsystems, vol. 16, No. 8, pp. 427–446, 1992.

Jex, Jerry, "Flash Memory BIOS for PC and Notebook Computers," IEEE Pacific Rim Conference on Communications, Computers, and Signal Processing, vol. 2 of 2, pp. 692–695, May 10, 1991.

(List continued on next page.)

*Primary Examiner*—Emanuel Todd Voeltz
*Assistant Examiner*—Peter J. Corcoran, III
*Attorney, Agent, or Firm*—Wolf, Greenfield & Sacks, P.C.

[57] ABSTRACT

There is provided with an information processing system capable of updating a basic input/output system (BIOS) programme without interrupting or stopping the operation of the system.

The information processing system (41) comprises an update programme memory (48) and a BIOS update flag (50). The update programme memory (48) retains the contents stored therein after the electrical power to the information processing system (41) has been turned off. An update programme input arrangement supplies an update basic input/output system programme to the update programme memory (48) to write the programme thereinto while the operating system is in operation. The update programme input arrangement then sets the BIOS update flag (50). A system loading arrangement copies the update basic input/output system programme stored in the update programme memory (48) to a memory area of a main memory (44) when the BIOS update flag (50) is set upon loading the operating system (i.e., when the information processing system is turned on or is reset).

33 Claims, 31 Drawing Sheets

OTHER PUBLICATIONS

IBM Technical Disclosure Bulletin "Halt/Reset Option in Non–Maskable Interrupt Handler", Sep. 1991.

IBM Technical Disclosure Bulletin "Update Mechanism For Personal Computer System Resident Firmware" Mar. 1992.

B. Dipert & D. Verner "Designing an updatable BIOS using Flash Memory" Microprocessors & Microsystems, Oct. 1992.

J. Shandle "Laptop Vendodrs Join the Flash Bandwagon" Electronics Nov., 1990.

FIG.17
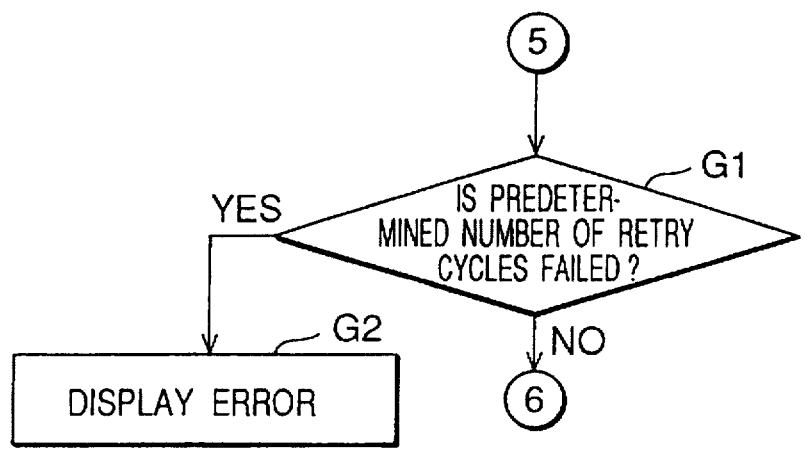
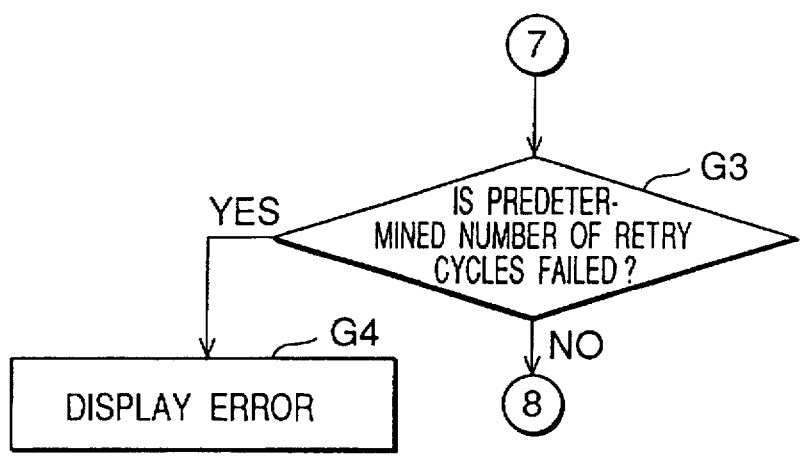

INFORMATION PROCESSING SYSTEM CAPABLE OF UPDATING A BIOS PROGRAMME WITHOUT INTERRUPTING OR STOPPING THE OPERATIONAL OF A SYSTEM

This application is a continuation, of application Ser. No. 08/363,690, filed Dec. 23, 1994, now abandoned.

BACKGROUND OF THE INVENTION

The present invention relates to an information processing system capable of updating a basic input/output system (BIOS) programme used for initializing and diagnosing the information processing system upon startup thereof and for controlling directly input/output hardware of peripheries such as fixed magnetic disc devices, flexible disc (i.e., floppy disc) devices, keyboards, and cathode-ray tubes (CRTs). More particularly, the present invention relates to an information processing system such as an advanced personal computer which can advantageously be used as a server in, for example, a local area network (LAN) and which has a basic input/output system programme that can be updated.

The basic input/output system programme responsible for controlling the allocation and usage of hardware resources of an information processing system such as a computer like a personal computer is called an operating system (OS). The term "operating system" is used in a wider sense to denote a system program including a basic input/output system programme that controls directly the hardware of the peripheries such as fixed magnetic disc devices, flexible disc devices, keyboards, and CRTs. This term represents, however, in a narrower sense a kernel of the system program which provides a logical interface to application programmes used for performing information processing. The term "operating system" is used hereinbelow in this narrower sense.

The basic input/output system programme is also called BIOS and may usually be stored in a non-volatile read-only memory (ROM) of which contents cannot be changed or rewritten on a board of the information processing system. It becomes, however, necessary to update the basic input/output system programme when specifications thereof are changed. When stored in the ROM of which contents cannot be changed on the board of the information processing system, the basic input/output system programme cannot be updated on-board. It is thus desirable to permit updating of the basic input/output system programme on the board of the information processing system.

With this respect, some conventional information processing systems permit on-board updating of the basic input/output system programme. The information processing system of the type described comprises a main memory, a memory for the basic input/output system (BIOS) programme, an erasable programmable read-only memory (EPROM), and a flexible disc device. The memory for BIOS is formed of a non-volatile memory such as a flash memory that is electrically writable and erasable on the board. In this system, a checksum test is carried out when there is no request for updating the basic input/output system programme. The test is performed to determine whether there is an error in the basic input/output system programme. If the checksum does not match, an error occurred.

The flexible disc is accessed when it is required to update the basic input/output system programme or if the checksum test for the programme written into the BIOS memory is terminated abnormally. It is then determined whether a flexible disc for use in updating the BIOS is mounted in the flexible disc device. If the flexible disc is not mounted, the operation is stopped because the information processing system cannot continue execution of the subsequent operation. If the flexible disc is mounted, new basic input/output system programme stored in the flexible disc is written into the BIOS memory.

In the information processing system of the type described, it is impossible to enter a new basic input/output system programme into the information processing system in the operating state. This means that the basic input/output system programme can be supplied to the information processing system only after the power is turned off or the system itself is reset. Accordingly, a maintenance operation to update the basic input/output system programme has to be made either after a user has stopped the operation of the information processing system or by means of interrupting the operation of the information processing system. This causes the operating ratio and the availability of the system to be deteriorated. In addition, workload on a maintenance engineer is increased. Further, the operation can be stopped only during a limited period when the information processing system acts as a server. It is thus difficult to update the system programme in this limited period of time.

The information processing system will enter a not-ready state at the time when the flexible disc storing a new basic input/output system programme is not mounted in the flexible disc device or when the checksum test for the programme written into the BIOS memory is terminated abnormally. Since the information processing system has stopped, it is impossible even to display a cause of the error of failure. Once failed, it often becomes troublesome to recover or establish a previous status from which execution can be resumed. If the information processing system cannot assist in locating failures, a similar failure may occur again. These factors further reduce the operating ratio and the availability of the information processing system.

Another conventional information processing system is disclosed in Japanese Patent Laid Open No. 61-221935 entitled by "STORING SYSTEM FOR MICROPROGRAMME". A central processing unit comprises a programmable read-only memory (PROM), an electrically erasable programmable read-only memory (EEPROM), a microprogramme storage, and an arithmetic unit. The PROM stores a microprogramme while the EEPROM stores only modified portions of the microprogramme. The microprogramme storage stores the microprogramme and the modified portions of the microprogramme when the power of the system is turned on. In the system disclosed in Japanese Patent Laid Open No. 61-221935 entitled by "STORING SYSTEM FOR MICROPROGRAMME", the EEPROM stores only the modified portion(s) of the microprogramme. The system of the type described is not applicable to information processing systems having a basic input/output system programme that may be updated. The checksum code, which is created by means of calculating previously a sum of the binary values corresponding to the individual addresses, is stored in the same BIOS memory containing the basic input/output system programme. Such modification of only a portion of the basic input/output system programme causes a mismatch with the checksum code. This system cannot be applied to the information processing system having the basic input/output system programme that may be updated.

SUMMARY OF THE INVENTION

Accordingly, the present invention is directed to overcoming the above mentioned problems and an object thereof is to provide an information processing system capable of writing a new basic input/output system programme into a memory thereof during normal user operation thereof and without shutdown thereof either by turning off the power or by resetting the information processing system.

Another object of the present invention is to provide an information processing system capable of automatically retrying writing of the basic input/output system programme to the memory when a checksum test is terminated abnormally.

It is yet another object of the present invention to provide an information processing system capable of displaying through a display device an error message indicative of a type of error detected when a predetermined number of retry cycles have occurred.

The present invention may be realized in an embodiment of an information processing system including a central processing unit, a main memory for storing instructions and data, a basic input/output system programme that works in connection with the hardware provided and an operating system which provides an interface between an application programme and the basic input/output system programme. Embodiments of the invention further include a non-volatile memory holding the basic input/output system programme and elements for receiving an updated basic input/output system programme and transferring the updated basic input/output system programme into the non-volatile memory without interfering with normal system operation. This embodiment of the invention further includes an update programme storing means which can retain the contents stored therein after the power supply to the information processing system is turned off, update programme input means for supplying an updated basic input/output system programme to the update programme storing means and for writing the programme into the update programme storing means while the operating system performs its interface functions, and system loading means for copying the updated basic input/output system programme from the update programme storing means to the non-volatile memory upon loading the operating system. This embodiment of the invention further includes a recovery memory in which is stored a recovery copy of the basic input/output system programme. This combination of elements cooperate to permit recovery in the event of a basic input/output system programme failure and to permit updating of the non-volatile memory without user reconfiguration. In simple terms, when the system fails to correctly load the basic input/output system programme from the non-volatile memory, control transfers to the recovery memory. The recovery copy of the basic input/output system programme is loaded from the recovery memory. Regardless of whether a failure has occurred or not, when an update basic input/output system programme is held in the update programme storing means, the contents of the non-volatile memory are written with the contents of the update programme storing means.

Numerous variations and improvements upon the above embodiment are contemplated. For example, there may be provided a basic input/output system programme update flag means which retains a basic input/output system programme update flag written thereto by the update programme input means. The basic input/output system programme flag is retained by the basic input/output system programme update flag means even when power to the information processing system has been turned off. The basic input/output system programme flag may be reset by the system loading means, when the updated basic input/output system programme is loaded into the memory.

In other variations of the above-described system, the update programme input means may be a floppy diskdrive, an IC card, a serial port connection, or a local area network connection. In each of these variations, the operating system provided may be of a multitasking type. When a multitasking operating system is used, an updated basic input/output system programme may be loaded into memory while a current basic input/output system programme is being executed out of memory. A software switch may then be automatically operated to cause the operating system to begin executing the updated basic input/output system programme, without the need to shut down and reboot the system.

BRIEF DESCRIPTION OF THE DRAWINGS

The foregoing features of the present invention may be more fully understood from the following detailed description presented hereinbelow in conjunction with the accompanying drawing, in which:

FIG. 17 is a flow chart illustrating retry operation carried out when transmission of data to a common memory is terminated abnormally according to the sixth embodiment of the present invention;

DETAILED DESCRIPTION OF THE PREFERRED EMBODIMENTS

Figure 1:
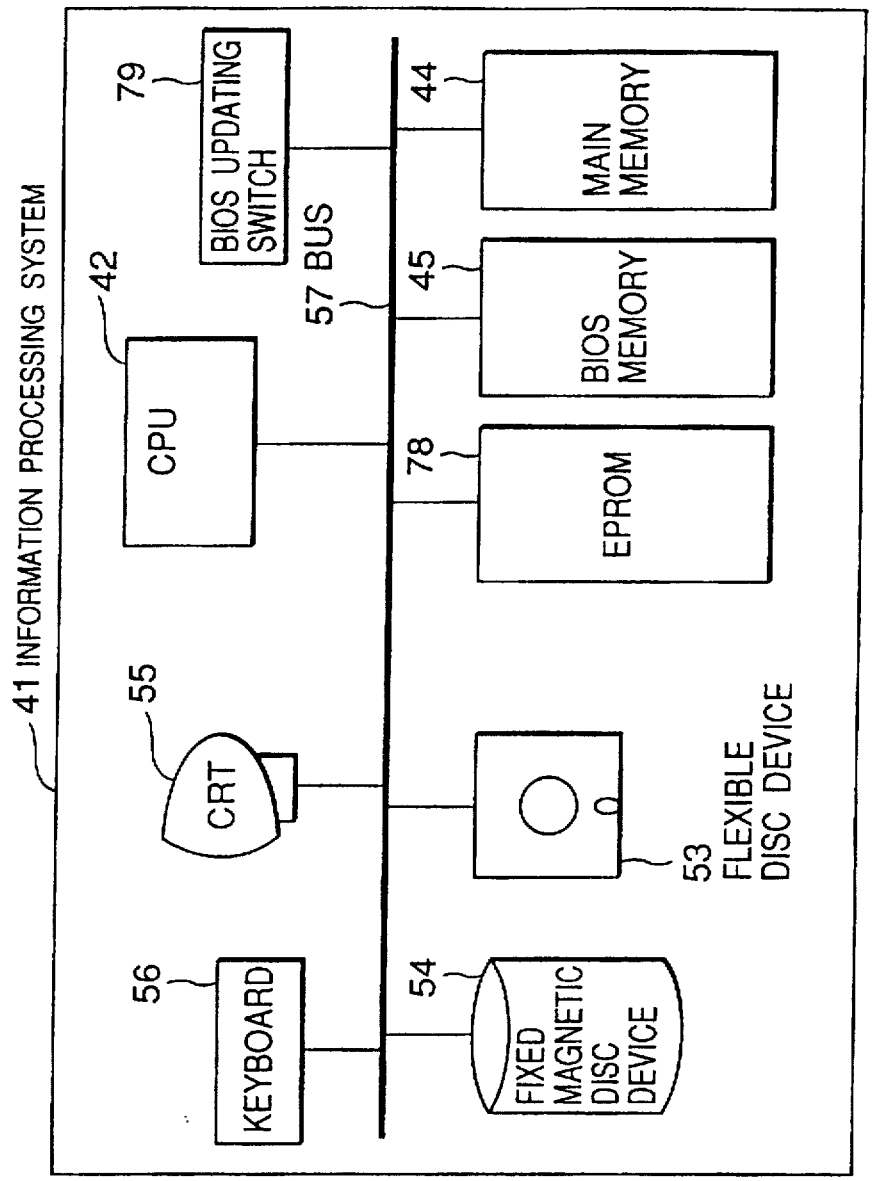
FIG. 1 is a functional block diagram showing a structure of a conventional information processing system having a basic input/output system programme which can be updated.

A conventional information processing system is described first to facilitate an understanding of the present invention. Throughout the following detailed description, like reference numerals represent like elements.

Referring to FIG. 1, an information processing system 41 comprises a central processing unit (CPU) 42, a main memory 44, a memory 45 for basic input/output system (BIOS) programmes, and an erasable programmable read-only memory (EPROM) 78. The information processing system 41 may be a personal computer or the like. The main memory 44 is formed of a volatile storage. The memory 45 for BIOS (hereinafter, referred to as a BIOS memory) is formed of a non-volatile memory such as a flash memory that is electrically writable and erasable on a board. The BIOS memory 45 retains its information even after the electrical power of the information processing system 41 has been switched off. The EPROM 78 is a non-volatile memory for storing a boot programme. The boot programme is a computer programme used to start the information processing system 41 just after switching the electrical power on or resetting. The information processing system 41 also comprises a flexible disc device 53, a fixed magnetic disc device 54, a display device 55, a keyboard 56, a bus 57, and a BIOS updating switch 79. The display device 55 is, in this example, a cathode-ray tube (CRT) on which information can be displayed for an operator in response to a command from the CPU 42. The operator uses the keyboard 56 if he or she supplies a command to the information processing system 41. The bus 57 is used for connecting the components of the information processing system 41 with each other. The BIOS updating switch 79 is used by the operator for instructing the information processing system 41 to update the basic input/output system programmes.

It is noted that EPROMs are memories that retain their contents until exposed to ultraviolet light. In other words, the EPROMs can be erased under ultraviolet light and a specifically designed device (ROM customizer) is required to write information in the EPROMs. On the contrary, flash memories are a type of an electrically erasable programmable read-only memory (EEPROM) in which data may be erased electrically and in which data may be rewritten electrically. Rewriting of the data can be made on the board of the information processing system.

Figure 2:
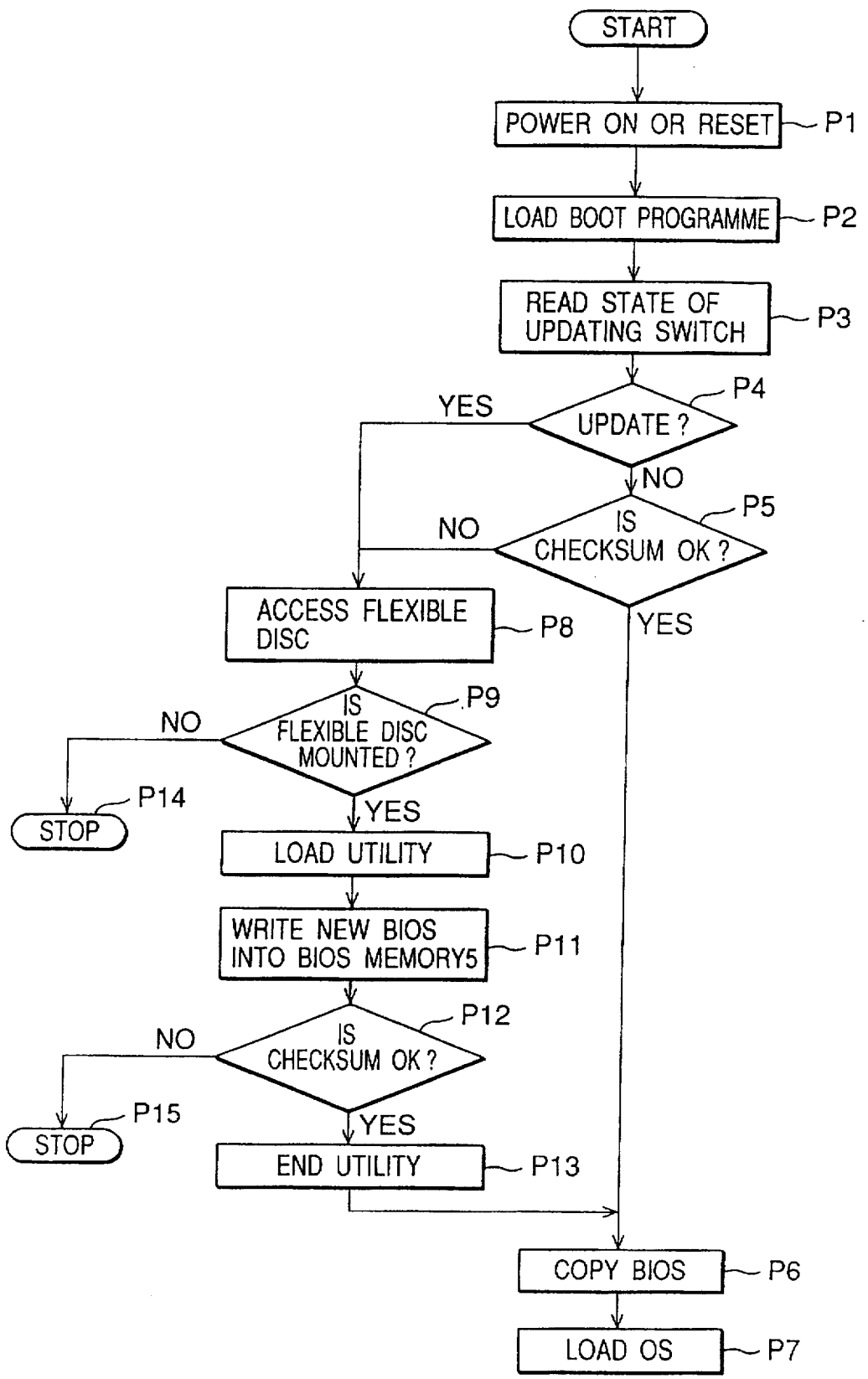
FIG. 2 is a flow chart illustrating operation of the conventional information processing system having a basic input/output system programme which can be updated.

Operation of the information processing system in FIG. 1 is now described with reference to FIG. 2. The following description is made in conjunction with a case where the information processing system 41 is a personal computer and a "shadowing" technique is used with a shadow random-access memory (RAM) in place of a read-only memory (ROM) because RAM is faster than ROM. The shadowing is employed to copy (load) the basic input/output system programmes stored in the BIOS memory 45 into an unused section of the main memory 44 (i.e., RAM) during the booting process of the system. Thereafter, requests for the basic input/output system programmes are diverted to their copies in the main memory 44 for execution. The section of the RAM into which the basic input/output system programmes are copied is called "shadow" RAM. The shadow RAM is in the same physical address as the BIOS memory 45. Accordingly, only the copied basic input/output system programmes in the main memory 44 are accessed after the system has been initialized (i.e., after the operating system has been loaded). It is impossible to access the BIOS memory 45 after the system has once been initialized.

First, the electrical power of the information processing system 41 is turned on or the information processing system 41 is reset at step P1. A boot programme stored in the boot programme storing memory (EPROM) 78 is loaded at step P2 to cause instructions loaded and executed successively. Next, a state of the BIOS updating switch 79 in the information processing system 41 is read at step P3. It is then determined at step P4 whether it is indicated to update the basic input/output system programmes. If the step P4 is positive representing that the updating of the basic input/output programmes is indicated, step P8 is carried out. On the other hand, if it is determined that the updating of the basic input/output system programmes is not indicated, step P5 is carried out.

When the basic input/output system programmes is not to be updated, it is determined through a test with a checksum whether there is an error in the basic input/output system programmes stored in the BIOS memory 45. More specifically, it is determined whether the sum of the digits in all addresses in the BIOS memory 45 (which is generally calculated along with a checksum code contained in the end or the start of a programme as a part thereof) matches with a predetermined value (e.g., zero). If the checksum matches with the predetermined value at step P5, step P6 follows. If the checksum does not match, an error occurred and step P8 is then carried out.

When the checksum test reveals that the BIOS memory 45 is normal, step P6 is carried out to load the basic input/output system programme stored in the BIOS memory 45 into the main memory 44. At step P7, a sequence of instructions are successively executed still on the main memory 44 to load the operating system (OS) from the magnetic disc device 54 into the main memory 44 to initialize the system. Application programmes and other programmes are executed upon request for information processing after the operating system has been loaded.

The flexible disc 53 is accessed at step P8 if it is determined at step P4 that the updating of the basic input/output system programme is indicated by the BIOS updating switch 79 or if the checksum test for the programme written into the BIOS memory 45 is terminated abnormally at step P5. It is then determined at step P9 whether a flexible disc for updating BIOS is loaded (mounted) in the flexible disc device 53. If the flexible disc is not mounted, the operation is stopped at step P14 because the information processing system 41 cannot proceed the further operation. On the contrary, if the flexible disc is mounted, utility programmes for use in updating the basic input/output system programmes are loaded into the main memory 44 at step P10 and instructions thereof are successively executed. More specifically, new basic input/output system programmes stored in the flexible disc are written into the BIOS memory 45 by using the utility programmes at step P11. At step P12, the checksum test is carried out for the basic input/output system programme written into the BIOS memory 45 at step P12.

If the checksum test is terminated abnormally at step P12, the information processing system 41 is prevented from performing any further operation. Accordingly, the operation is stopped at step P15. If the checksum test at step P12 is terminated normally, execution of the utility programmes is ended at step P13. The control is passed to the BIOS memory 45 to carry out processing at and after step P6.

As mentioned above, the basic input/output system programme can be updated in this information processing system. It is, however, impossible to enter a new basic input/output system programme during operation of the information processing system. As a result, the conventional information processing system has problems described in the preamble of the instant specification. In addition, the information processing system will be shifted to a not-ready state at the time when the flexible disc storing a new basic input/output system programme is not mounted in the flexible disc device or when the checksums test for the programme written into the BIOS memory is terminated abnormally without any notice the user of the failure.

While the above mentioned conventional information processing system has thus been described in conjunction with the case where the shadow memory is used, it is impossible to modify the data in the BIOS memory 45 after starting-up the system without the shadow memory. This is because that when the shadow memory is not used the basic input/output system programmes stored in the BIOS memory 45 are used by the operating system in operation. Accordingly, it is necessary to down or turn off the power of the information processing system, or alternatively to reset it to supply the basic input/output system programme thereto.

Figure 3:
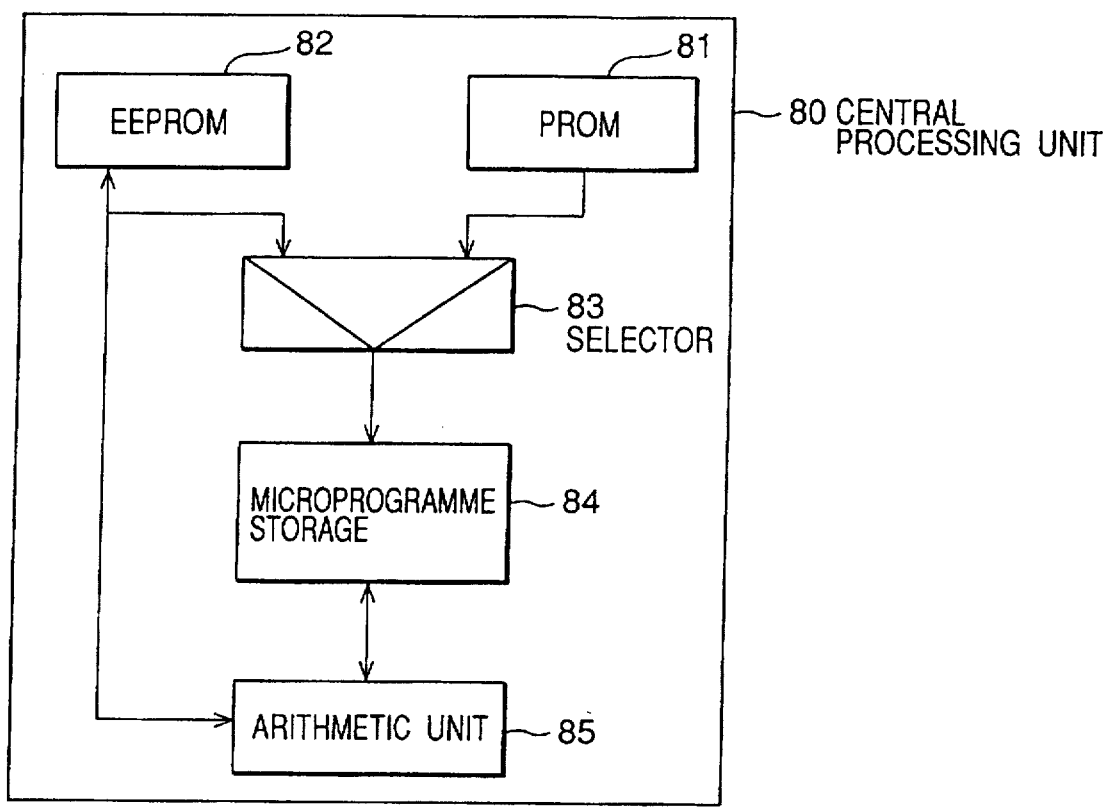
FIG. 3 is a functional block diagram showing a structure of a conventional information processing system having a microprogramme modifying arrangement.

FIG. 3 is a functional block diagram showing an information processing system disclosed in Japanese Patent Laid Open No.61-221935 entitled by "STORING SYSTEM FOR MICROPROGRAMME". In the figure, a central processing unit (CPU) 80 comprises a programmable read-only memory (PROM) 81, an electrically erasable programmable read-only memory (EEPROM) 82, a selector 83, a microprogramme storage 84, and an arithmetic unit 85. The PROM 81 stores a microprogramme while the EEPROM 82 stores only modified portions of the a microprogramme. The selector 83 selects and transmits either one of the outputs of the PROM 81 and the EEPROM 82. The microprogramme storage 84 stores the a microprogramme and the modified portions of the a microprogramme when the power of the system is turned on. The arithmetic unit 85 carries out processing in response to micro operations supplied from the microprogramme storage 84.

Figure 4:
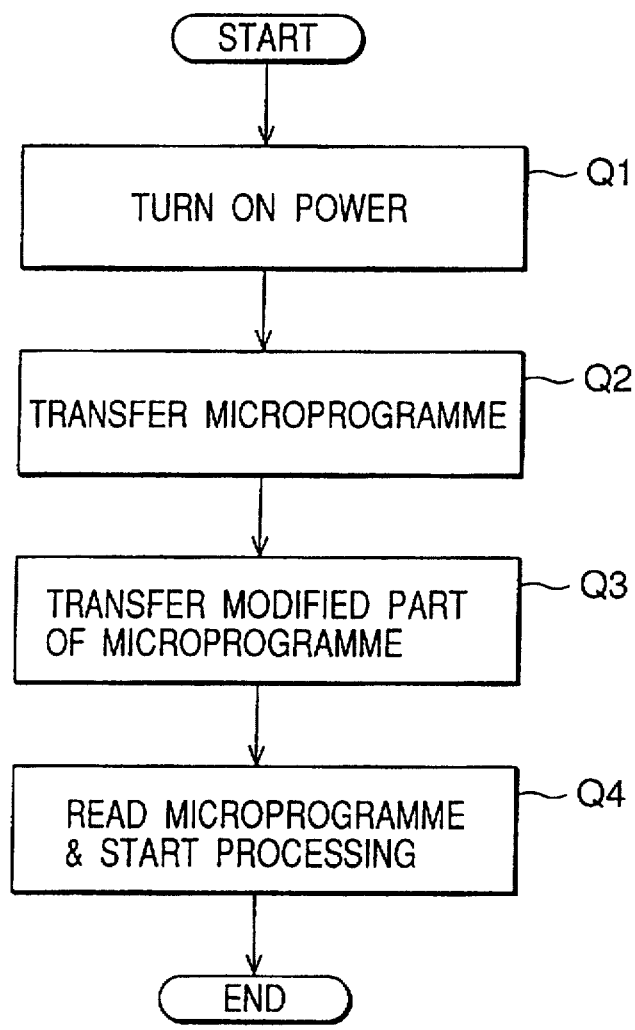
FIG. 4 is a flow chart illustrating operation of the conventional information processing system having A microprogramme modifying arrangement.

Operation of the system in FIG. 3 is described with reference to a flow chart in FIG. 4. When the power of the central processing unit 80 is turned on at step Q1, the a microprogramme in the PROM 81 is transferred to the microprogramme storage 84 at step Q2. At step Q3, modified portions of the a microprogramme in the EEPROM 82 are transferred to the microprogramme storage 84. In addition, the arithmetic unit 85 reads, at step Q4, the microprogramme out of the microprogramme storage 84 to start processing.

In the system disclosed in Japanese Patent Laid Open No. 61-221935 entitled by "STORING SYSTEM FOR MICROPROGRAMME", the EEPROM stores only the modified portion(s) of the microprogramme. The system of the type described is not applicable to information processing systems having basic input/output system programmes that can be updated. The checksum code, which is obtained by means of calculating previously a sum of the addresses, is stored in the same BIOS memory containing the basic input/output system programmes. Such modification of only a portion of the basic input/output system programme causes mismatch with the checksum code. Accordingly, this system cannot be applied to the information processing system having the basic input/output system programmes that may be updated.

Next, embodiments of the present invention are described.

First Embodiment

Figure 5:
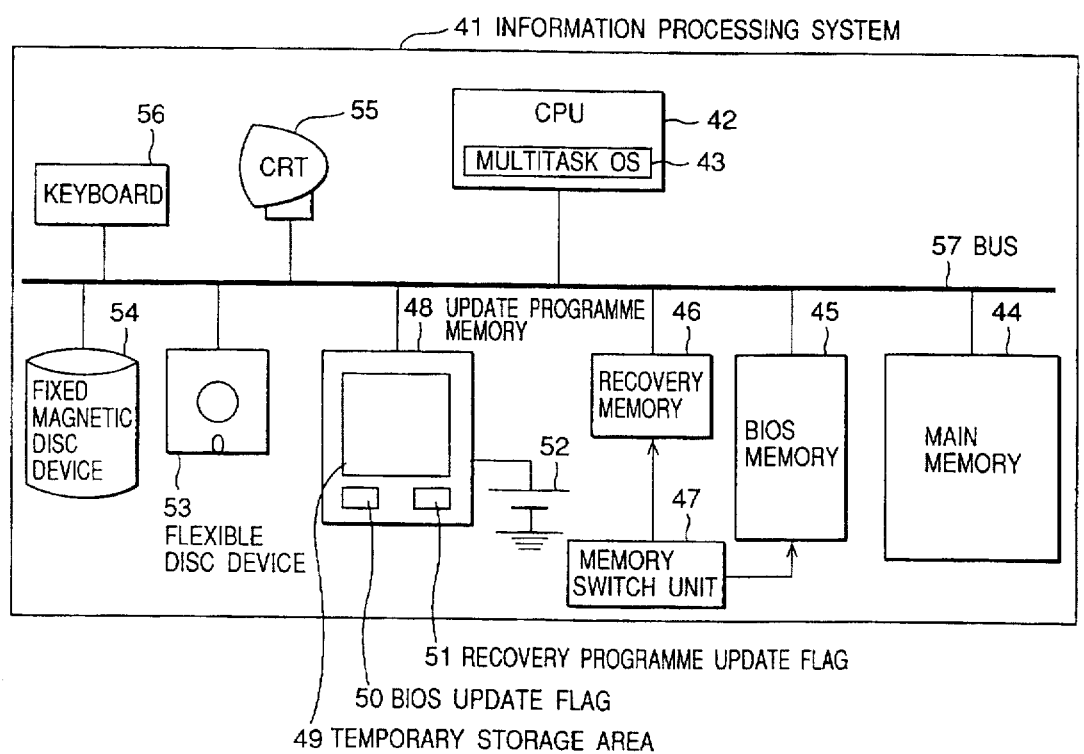
FIG. 5 is a functional block diagram showing a structure of an information processing system according to a first embodiment of the present invention.

FIG. 5 shows an information processing system 41 having basic input/output system programmes which can be updated according to the present invention. The information processing system 41 such as a personal computer comprises a central processing unit (CPU)42, a multitask operating system (multitask OS) 43, a main memory 44, a BIOS memory 45, a recovery memory 46, and a memory switch unit 47. With the multitask OS 43 two or more application programmes are loaded at the same time. This multitask OS 43 is loaded from the fixed magnetic disc device 54 (described later) into the main memory 44 upon starting up the system. The operating system 43 is illustrated in the CPU 42 because it forms, by the functional considerations, a part of the information processing system. The main memory 44 may be formed of a volatile memory such as a dynamic random-access memory (DRAM). DRAMs are memories which require their contents to be refreshed at a predetermined cycle to maintain or retain data therein. In spite of such requirements of a refresh operation, a DRAM is often used as a main memory for personal computers because it is cheap.

The BIOS memory 45 is for storing the basic input/output system programmes while the recovery memory 46 is for storing programmes for use in performing operations required to restore the system when a failure occurs. The BIOS memory 45 and the recovery memory 46 are non-volatile memories of which contents may be rewritten on the board. These memories may be formed of, for example, flash memories. As described above, flash memories are derived from EEPROMs of which contents may be rewritten on the board of the information processing system. The memory switch unit 47 is for use in switching between the BIOS memory 45 and the recovery memory 46. More specifically, the memory switch unit 47 switches the BIOS memory 45 into the recovery memory 46 when the information processing system 41 fails to load the basic input/output system programmes stored in the BIOS memory 45.

The information processing system 41 also comprises a memory 48 for updated programmes (hereinafter, referred to as update programme memory). The update programme memory 48 is formed of a static random-access memory (SRAM) which retains the contents stored therein as long as there is enough power supplied from a battery 52 even after the information processing system is turned off. The update programme memory serves as update programme memorizing arrangement. SRAMs are usually much faster and reliable than DRAMs. In addition, SRAMs require no refreshing to retain the contents stored therein. The update programme memory 48 comprises a temporary storage area 49, a BIOS update flag 50, and a recovery programme update flag 51. The temporary storage area 49 is for use in storing temporarily a new basic input/output system programme or a new recovery programme. The BIOS update flag 50 indicates status where a new basic input/output system programme not being copied into the BIOS memory 45 is stored in the temporary storage area 49. The BIOS update flag 50 serves as basic input/output system programme update flag in this embodiment. Likewise, the recovery programme update flag 51 indicates status where a new recovery programme not being copied into the recovery memory 46 is stored in the temporary storage area 49. As mentioned above, the update programme memory 48 can retain its contents even after the power supply to the information processing system 41 is disconnected. In this event, the update programme memory 48 is supplied with power by the battery 52.

The information processing system 41 comprises a flexible disc device 53, a fixed magnetic disc device 54, a display device 55, and a keyboard 56. The display device 55 may be formed of a cathode-ray tube (CRT) or a liquid crystal to display information thereon for users. The keyboard 56 is used by a user to enter commands or the like. While not being illustrated, an input device such as a mouse may also be provided.

As will be described below, the update programme memory 48 in this embodiment comprises the BIOS update flag 50 which is set upon updating the basic input/output system programme. A new basic input/output system programme is transferred to the temporary storage area 49 to the BIOS memory 45 only when the BIOS update flag 50 is set upon initialization of the system. However, the BIOS update flag 50 may be omitted if required. In such a case, the new basic input/output system programme is stored in the temporary storage area 49 in the update programme memory 48 may be transferred therefrom to the BIOS memory 45 whenever the system is initialized. This structure causes, however, an overhead involved in the transference.

In this embodiment, the BIOS update flag 10 is reset when the new basic input/output system programme is transferred from the temporary storage area 49 to the BIOS memory 45 upon initialization of the system. However, the BIOS update flag 50 may be set when the basic input/output system programme is updated rather than when it is transferred. In this event, it is possible to at least reduce the above mentioned overhead because transference can be omitted until an update operation is performed first.

Operation of the information processing system 41 according to this embodiment is described with reference to flow charts in FIGS. 6 through 10. It is noted that the following description is made for a case where the basic input/output system programmes are stored in a "shadow" RAM. More specifically, the basic input/output system programmes stored in the BIOS memory 45 are copied or loaded therefrom into the main memory (shadow RAM) 44 during the booting process of the system. Once copied, the CPU 42 uses the "copied"basic input/output system programmes in the main memory 44 and only the copied basic input/output system programmes in the main memory 44 are accessed. It is impossible to access the BIOS memory 45 after the basic input/output system programmes have been copied into the main memory 44.

Figure 6:
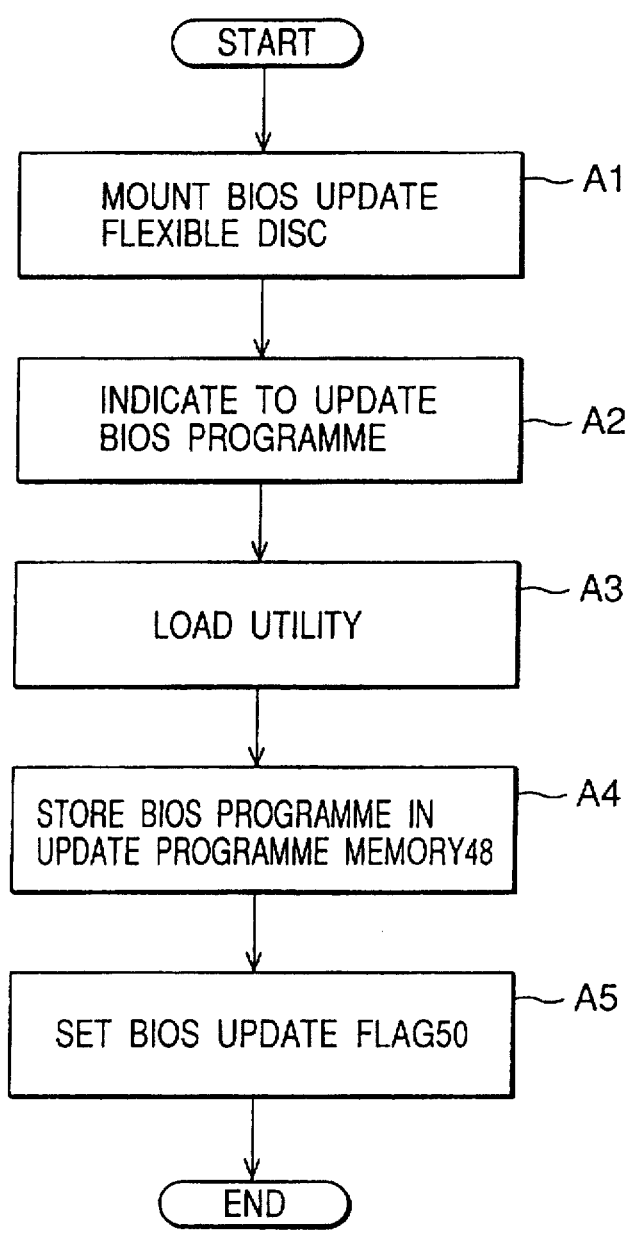
FIG. 6 is a flow chart illustrating operation in supplying a new basic input/output system programme into a memory for update programmes according to the first embodiment of the present invention.
Figure 7:
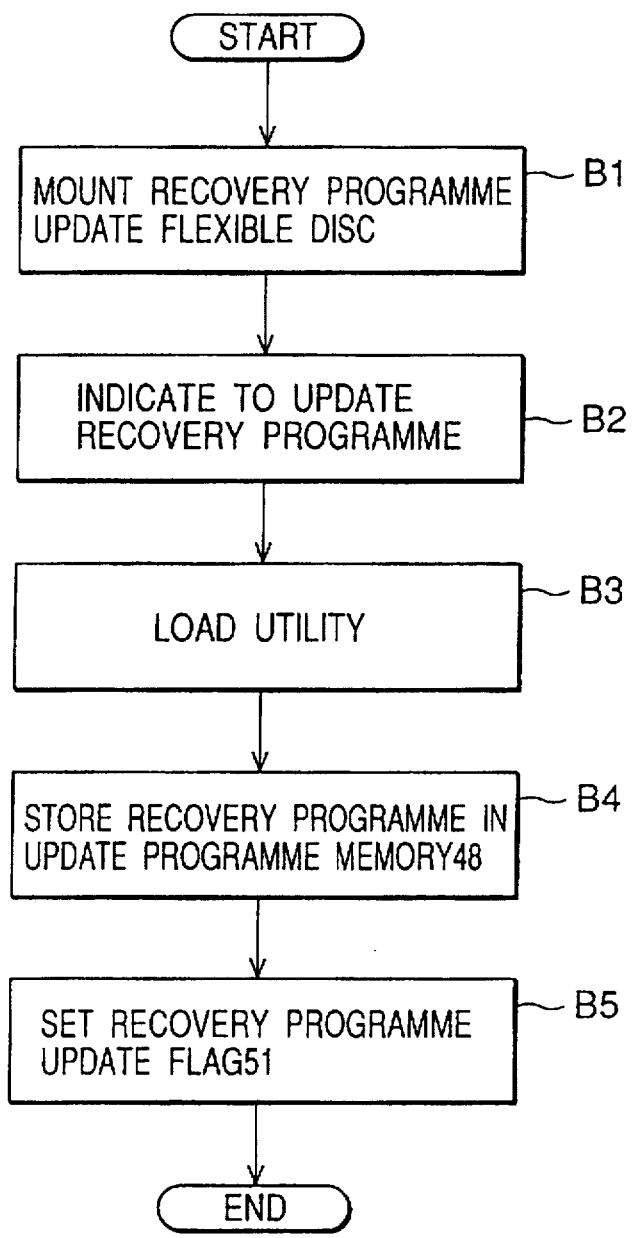
FIG. 7 is a flow chart illustrating operation in supplying a new recovery programme into a memory for update programmes according to the first embodiment of the present invention.
Figure 8:
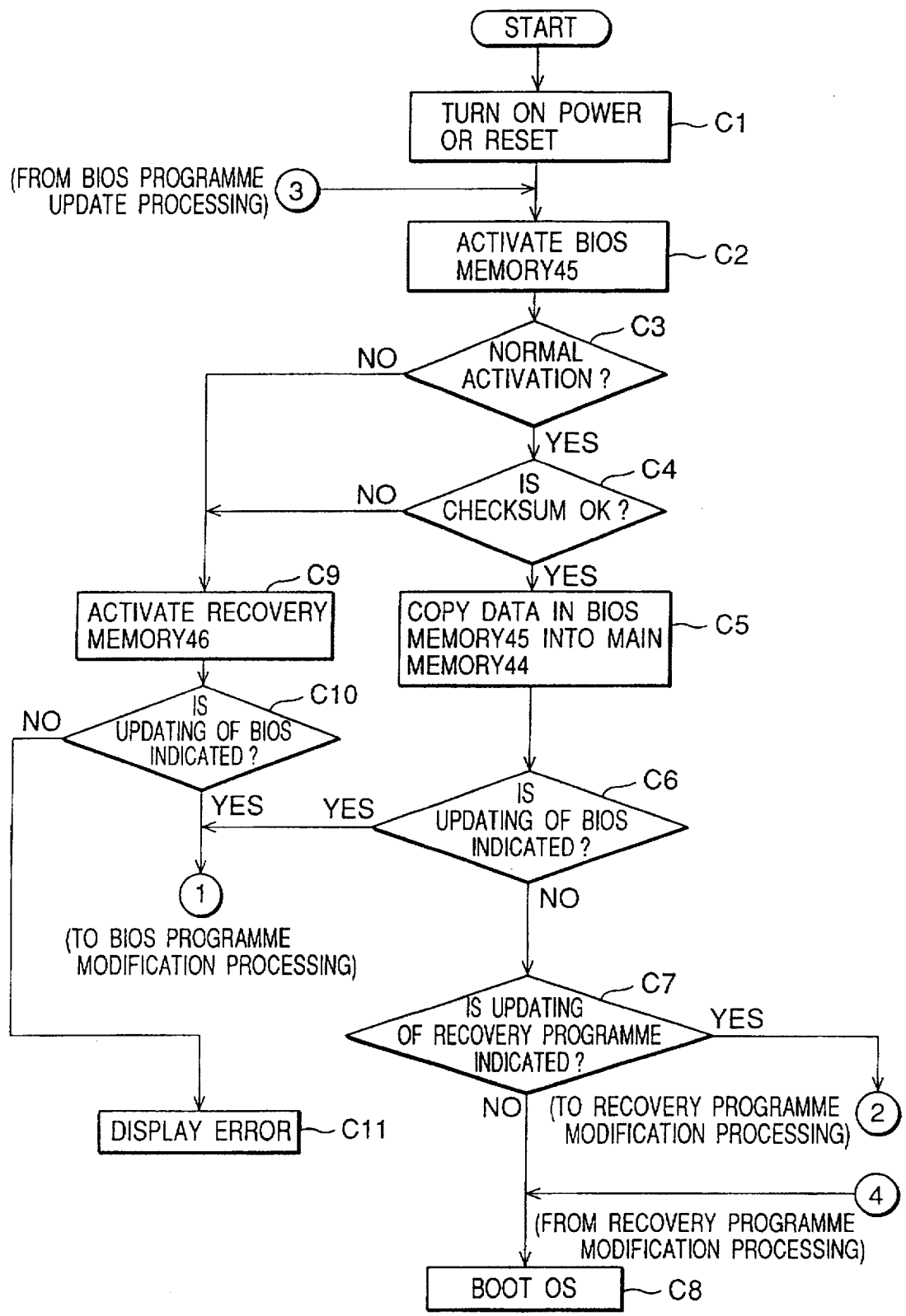
FIG. 8 is a flow chart illustrating operation in turning on the power of the information processing system or resetting it according to the first embodiment of the present invention.
Figure 9:
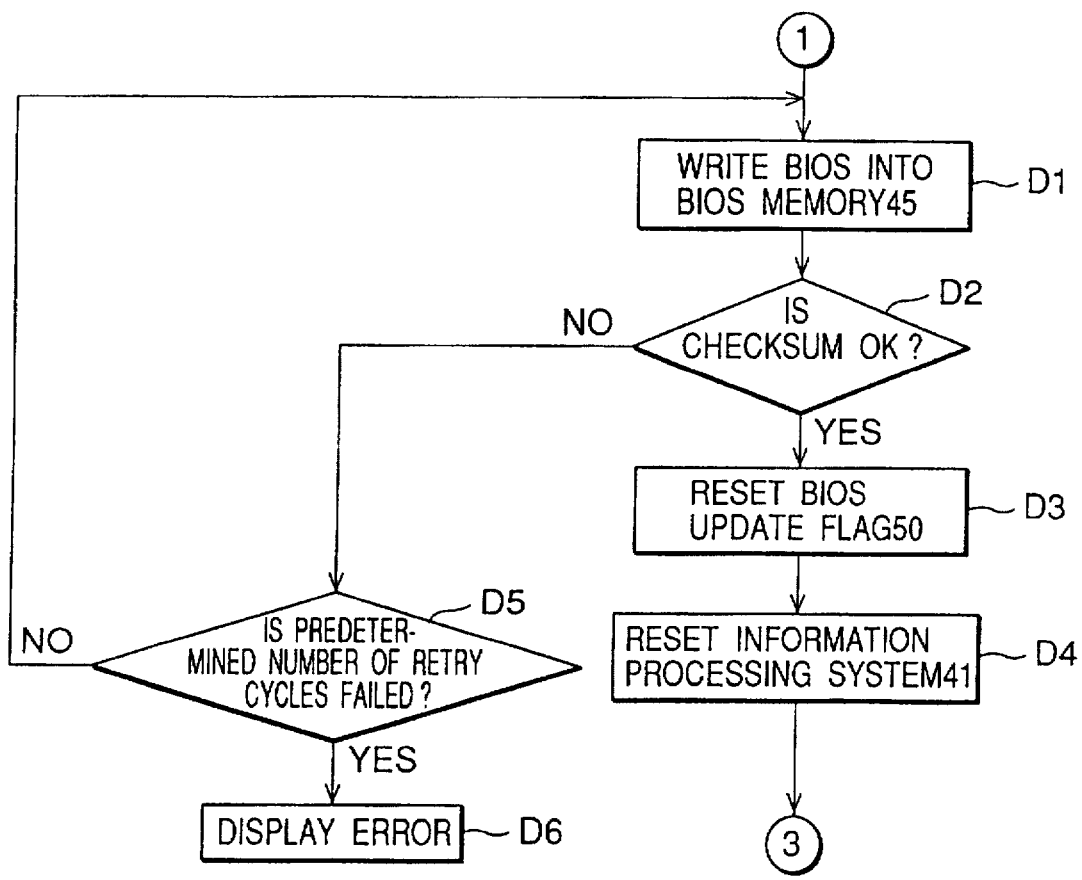
FIG. 9 is a flow chart illustrating operation in updating basic input/output system programmes according to the first embodiment of the present invention.
Figure 10:
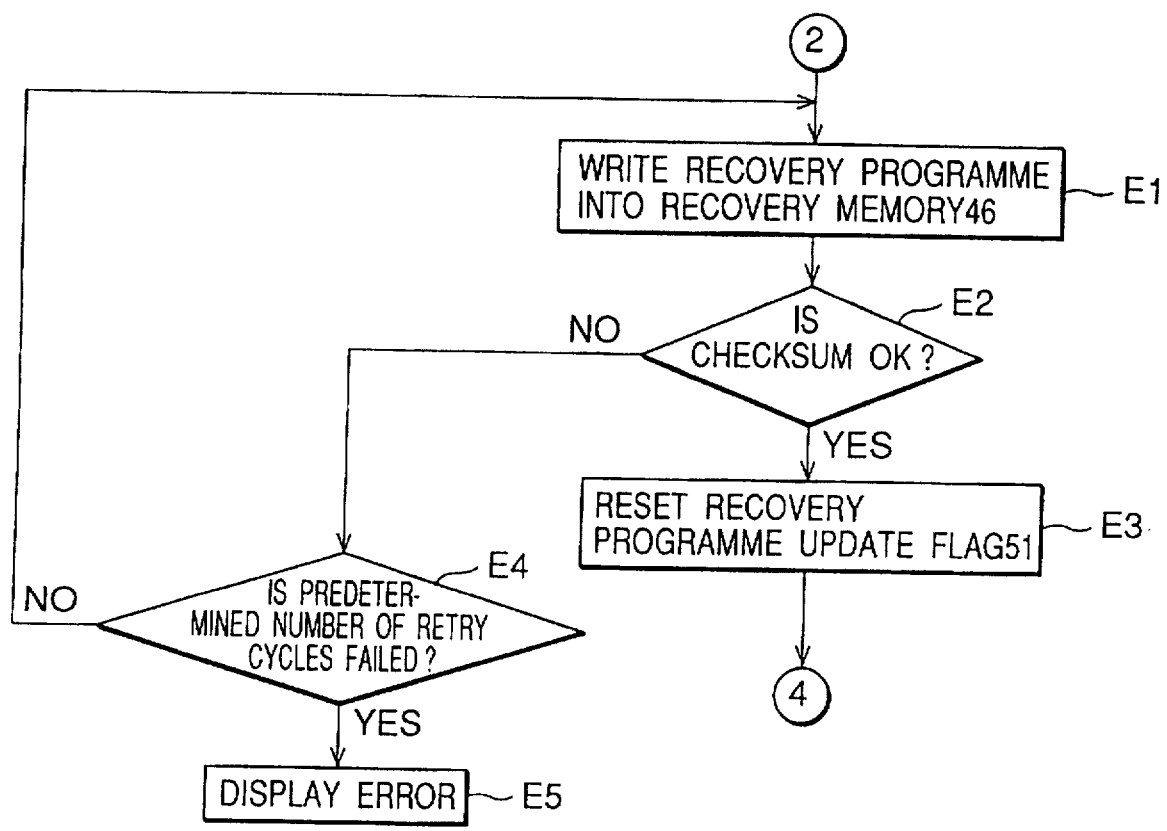
FIG. 10 is a flow chart illustrating operation in updating recovery programmes according to the first embodiment of the present invention.

FIG. 6 is a flow chart for use in describing operation of supplying a new basic input/output system programme to the static RAM of the update programme memory 48 without requiring neither to turn off the power for the information processing system 41 nor to reset the information processing system 41. FIG. 7 is a flow chart for use in describing operation of supplying a new recovery programme to the static RAM of the update programme memory 48 without requiring neither to turn off the power for the information processing system 41 nor to reset the information processing system 41. FIG. 8 is a flow chart for use in describing operation when the information processing system 41 is turned on or reset. FIG. 9 is a flow chart illustrating operation in updating the basic input/output system programme during the routine of the flow chart in FIG. 8. FIG. 10 is a flow chart illustrating operation in updating the recovery programme during the routine of the flow chart in FIG. 8.

To update the basic input/output system programme, a new basic input/output system programme is written into the update programme memory 48 in a following manner according to the flow chart in FIG. 6 during operation of the system. In this event, the processing is carried out on the multitask operation system 43 in operation. Accordingly, the controls in FIG. 6 can be made while executing other application programmes without causing the system to be down.

As will be described below, information processing tasks are performed with a help of application programmes after the multitask operating system 43 is loaded completely. In this event, a command interpreter programme is first loaded from the fixed magnetic disc device 54. The application programmes are executed as a child process. When the application programme does not use the CRT 55 (entire or a part of the screen) and the keyboard 56, the command interpreter remaining in the main memory 44 is allowed by the multitask operating system 43 to use the CRT 55 (entire or a part of the screen) and the keyboard 56. Accordingly, commands supplied by an operator through the keyboard 56 are accepted and processed by the command interpreter. The application programme indicated by the command is then loaded and executed. The typed commands may be executed by a command interpreter loaded later or any other applications having a function of controlling the CRT 55 (entire of a part of the screen) and the keyboard and of processing the typed commands rather than by the command interpreter or the parent process.

The control routine illustrated in FIG. 6 is described now. At step A1, an operator loads or mounts a flexible disc for updating the basic input/output system programmes (hereinafter, referred to as a BIOS update flexible disc) into the flexible disc device 53. The flexible disc contains a new basic input/output system programme as well as utility programmes for updating the BIOS programme. The utility programmes may be resident in the fixed magnetic disc device 54. At step A2, the operator indicates to update the basic input/output system programmes through the keyboard 56. In other words, the operator enter through the keyboard 56 commands for use in loading the utilities to update the basic input/output system programmes. A mouse (not shown) may be used as the input device in place of the keyboard 56. In such a case, the operator enter commands through the mouse.

At step A3, the command interpreter issues a call to the system to load and execute the utility programme(s) indicated by the operator. More specifically, the command interpreter issues a call to functions of loading and executing the application programme provided by the multitask operating system 43. In response to this, the multitask operating system 43 in operation loads the utility programmes from the flexible disc device 53 to the main memory 44 in a time sharing manner without stopping the other application programmes in the course of operation. The multitask operating system 43 then passes the control to the utility programmes loaded on the main memory 44. In this event, a direct control to the hardware of the flexible disc device 53 is performed through the basic input/output system programmes copied on the main memory 44.

At step A4, the utility programmes are executed on the multitask operating system 43 to read the new basic input/output system programme out of the flexible disc and store it in the temporary storage area 49 within the update programme memory 48 that receives power from the battery. In addition, at step A5, the BIOS update flag 50 in the update programme memory 48 is set. The update programme memory 48 retains the contents stored therein as long as there is enough power supplied from a battery 52. Accordingly, the new basic input/output system programme stored and the BIOS update flag 50 are retained rather than erased after the information processing system 41 is turned off.

To update the recovery programme, a new recovery programme is written into the update programme memory 48, as the updating of the BIOS, in a following manner according to the flow chart in FIG. 7 during operation of the system. In this event, the processing is carried out on the multitask operation system 43 in operation. Accordingly, the controls in FIG. 6 can be made while executing other application programmes without causing the system to be down. The routine in FIG. 3 can thus be executed while executing other application programme(s).

At step B1, an operator loads or mounts a flexible disc for updating the recovery programmes (hereinafter, referred to as a recovery update flexible disc) into the flexible disc device 53. The flexible disc contains a new recovery programme as well as utility programmes for updating the recovery programme. The utility programmes may be resident in the fixed magnetic disc device 54. At step B2, the operator indicates to update the recovery programmes through the keyboard 56. In other words, the operator enter through the keyboard 56 commands for use in loading the utilities to update the recovery programmes. A mouse (not shown) may be used as the input device in place of the keyboard 56. In such a case, the operator enter commands through the mouse.

At step B3, the command interpreter issues a call to the system to load and execute the utility programmers) indicated by the operator. More specifically, the command interpreter issues a call to functions of loading and executing the application programme provided by the multitask operating system 43. In response to this, the multitask operating system 43 in operation loads the utility programmes from the flexible disc device 53 to the main memory 44 in a time sharing manner without stopping the other application programmes in the course of operation. The multitask operating system 43 then passes the control to the utility programmes loaded on the main memory 44. In this event, a direct control to the hardware of the flexible disc device 53 is performed through the recovery programmes copied on the main memory 44.

At step B4, the utility programmes are executed on the multitask operating system 43 to read the new recovery programme out of the flexible disc and store it in the temporary storage area 49 within the update programme memory 48 that receives power from the battery. In addition, at step B5, the recovery programme update flag 51 in the update programme memory 48 is set. The update programme memory 48 retains the contents stored therein as long as there is enough power supplied from a battery 52. Accordingly, the new recovery programme stored and the recovery programme update flag 51 are retained rather than erased after the information processing system 41 is turned off.

Next, operation in turning on the power of the information processing system 41 or resetting it according to the present embodiment is described in conjunction with FIG. 8.

When the information processing system 41 is turned on or reset at step C1, the BIOS memory 45 is activated at step C2. At step C3, the memory switch unit 47 monitors normal initiation of the processing with the BIOS memory 45 activated. If the BIOS memory 45 is not activated normally at step C3, step C9 is carried out. If it is determined at step C3 that the BIOS memory 45 is activated normally, then step C4 is carried out. At step C4, a checksum test is performed on the BIOS memory 45. More specifically, it is checked whether the sum of the all addresses in the BIOS memory 45 matches with a pre-calculated value to determine whether there is no error occurred in the basic input/output system programme stored in the BIOS memory 45. When the checksum test at step C4 is terminated normally, the contents in the BIOS memory 45 is copied at step C5 into the main memory 44 as a shadow copy. The operation is then continued on the main memory 44. At step C6, the BIOS update flag 50 is referred to determine whether update of the basic input/output system programme is indicated. When the BIOS update flag 50 is set indicative of the updating of the basic input/output system programme, a basic input/output system programme update processing illustrated in FIG. 9 is carried out. The basic input/output system programme update processing will be described later.

If the updating of the basin input/output system programme is not indicated, step C7 is carried out. At step C7, it is determined whether update of the recovery programme is indicated by means of referring the recovery programme update flag 51. When update the recovery programme is indicated, a recovery programme update processing in the flow chart illustrated in FIG. 10 is carried out. This will be described later.

When the updating of the recovery programme is not indicated, step C8 is executed to perform diagnostic processing or the like. Subsequently, the multitask operating system 43 is read out of the fixed magnetic disc device 54 into the main memory 44 to start up the system. Thereafter, the application programmes are executed on the multitask operating system 43 to perform necessary information processing tasks. Once the multitask operating system 43 is loaded, the CPU 42 cannot access the BIOS memory 45 and the recovery memory 46.

The memory switch unit 47 activates the recovery memory 46 at step C9 if the BIOS memory 45 is not activated normally at step C3 or if the checksum test for the programme written into the BIOS memory 45 at step C4 is terminated abnormally. Next, at step C10, the BIOS update flag 50 is referred to determine whether the updating of the basic input/output system programme is not indicated. If it is indicated, executed is the basin input/output system programme update processing of the flow chart illustrated in FIG. 9, which will be described later. If the updating of the basic input/output system programme is not indicated, step C11 is carried out to display an error message on the CRT 65 because it is impossible to recover the system. The operation of the information processing system 41 is then stopped.

If the updating of the basic input/output system programme is indicated at step C6 or step C10, a new basic input/output system programme is loaded into the BIOS memory 45 in a following manner according to the routine illustrated in FIG. 9. At step D1, the new basic input/output system programme stored in the temporary storage area 49 of the update programme memory 48 is written into the BIOS memory 45 through the bus 57. Next, at step D2, the checksum test is performed on the BIOS memory 45. When the checksum test is terminated normally, the BIOS update flag 50 in the update programme memory 48 is reset at step D3. Next, the entire information processing system 41 is reset at step D4 to return the system to an initial condition for executing again the processing at and after step C2 in FIG. 8. On the other hand, if the checksum test is terminated abnormally at step D2, the number of retry cycles of steps D1 and D2 is determined at step D5. In other words, it is determined whether the number of retry cycles exceeds a predetermined value (such as 10 times). If the number of retry cycles failed is not larger than the predetermined number, then the control is passed to step D1. On the other hand, if the predetermined number of retry cycles are failed, an error message is displayed on the CRT 65 at step D6 to stop the processing.

When the updating of the recovery programme is indicated at step C7, a new recovery programme is written into the recovery memory 46 in a following manner according to the routine illustrated in FIG. 10. At step E1, the new recovery programme stored in the temporary storage area 49 of the update programme memory 48 is written into the recovery memory 46 through the bus 57. At step E2, the checksum test is performed the recovery memory 46. When the checksum test is terminated normally, the recovery programme update flag 51 in the update programme memory 48 is reset at step E3 to proceed to the processing at step C8 in FIG. 8. If the checksum test is terminated abnormally at step E2, the number of retry cycles of steps E1 and E2 is determined at step E4. If the number of retires failed is not larger than a predetermined value (such as ten), the control is passed to step E1. If the predetermined number of retry cycles are failed, an error message is displayed on the CRT 65 at step E5 to stop the processing.

Second Embodiment

Figure 11:
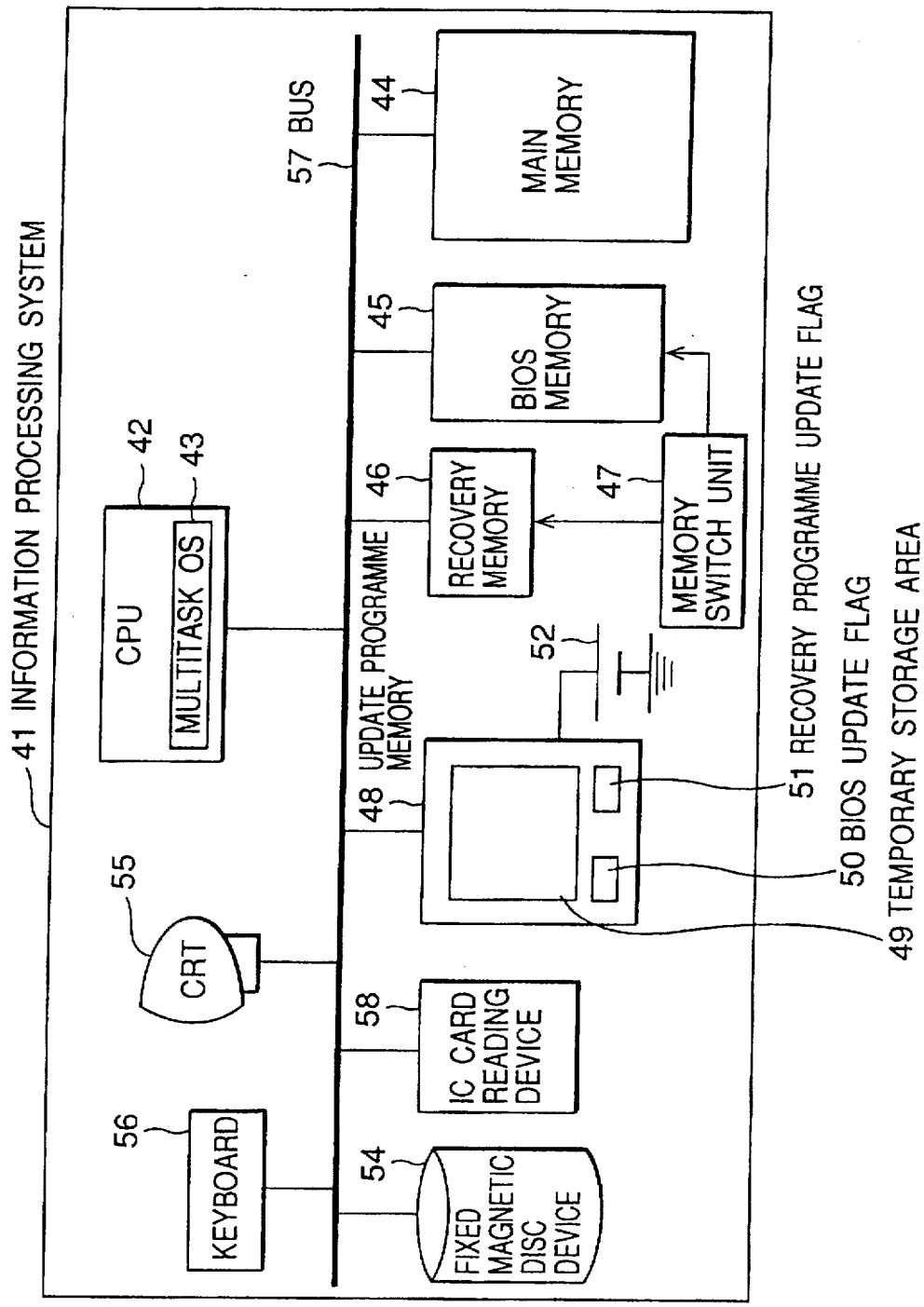
FIG. 11 is a functional block diagram showing a structure of an information processing system according to a second embodiment of the present invention.

FIG. 11 shows an information processing system according to a second embodiment of the present invention. This information processing system is similar to that described in conjunction with the first embodiment except that an IC card reading device 58 is provided in place of the flexible disc device 53 to permit entrance of a new basic input/output system programme and a new recovery programme from an IC card. In this event, the new basic input/output system programme and the new recovery programme are recorded on the IC card. In the processes in FIGS. 6 and 7, an operator inserts the IC card into the IC card reading device 58. Other operations and functions are similar to those described in conjunction with the first embodiment.

Third Embodiment

Figure 12:
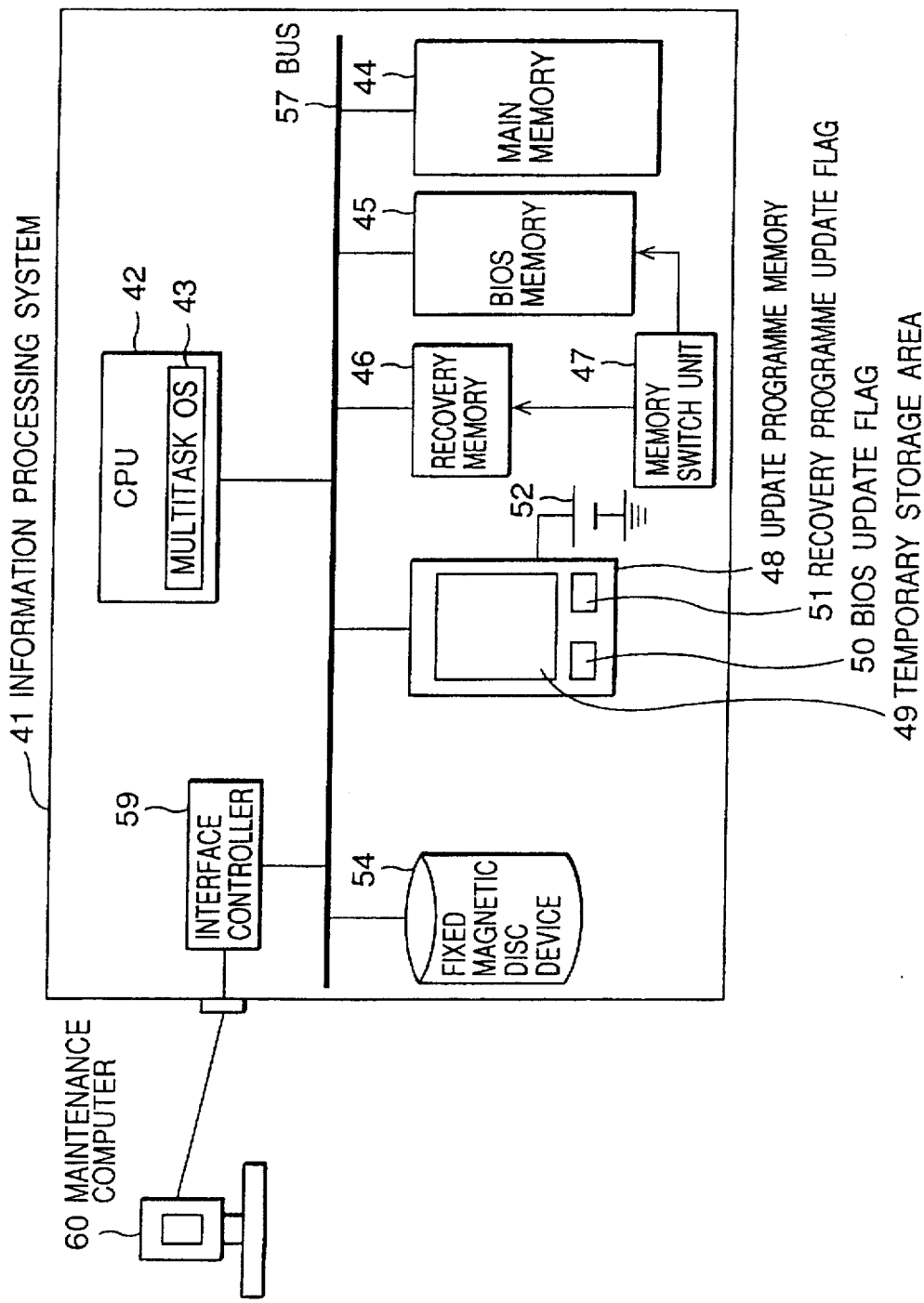
FIG. 12 is a functional block diagram showing a structure of an information processing system according to a third embodiment of the present invention.

FIG. 12 shows an information processing system according to a third embodiment of the present invention. This information processing system is similar to that described in conjunction with the first embodiment except that an interface controller 59 such as RS323C is provided in place of the flexible disc device 53, the CRT 55, and the keyboard 56. In this embodiment, the new basic input/output system programme and the new recovery programme are supplied from a maintenance computer 60 to the information processing system 41 through this interface controller 59. To update the basic input/output system programme or the recovery programme, an operator loads a flexible disc in which a new basic input/output system programme or a new basic input/output system programme is recorded by using a flexible disc device or the like accompanying to the maintenance computer 60. In addition, the operator transmits the new basic input/output system programme or the new recovery programme to the information processing system 41 by means of entering commands through a keyboard accompanying to the computer 60. The new basic input/output system programme or the new recovery programme is thus sent to the information processing system 41. The information processing system 41 receives it through the interface controller 59. The information processing system 41 then stores the received programme into the temporary storage area 49 in the update programme memory 48. In addition, the information processing system 41 sets either the BIOS update flag 50 or the recovery programme update flag 51 according to whether the transmitted programme is the basic input/output system programme or the recovery programme. Other functions and operations are similar to those described in conjunction with the first embodiment.

Fourth Embodiment

Figure 13:
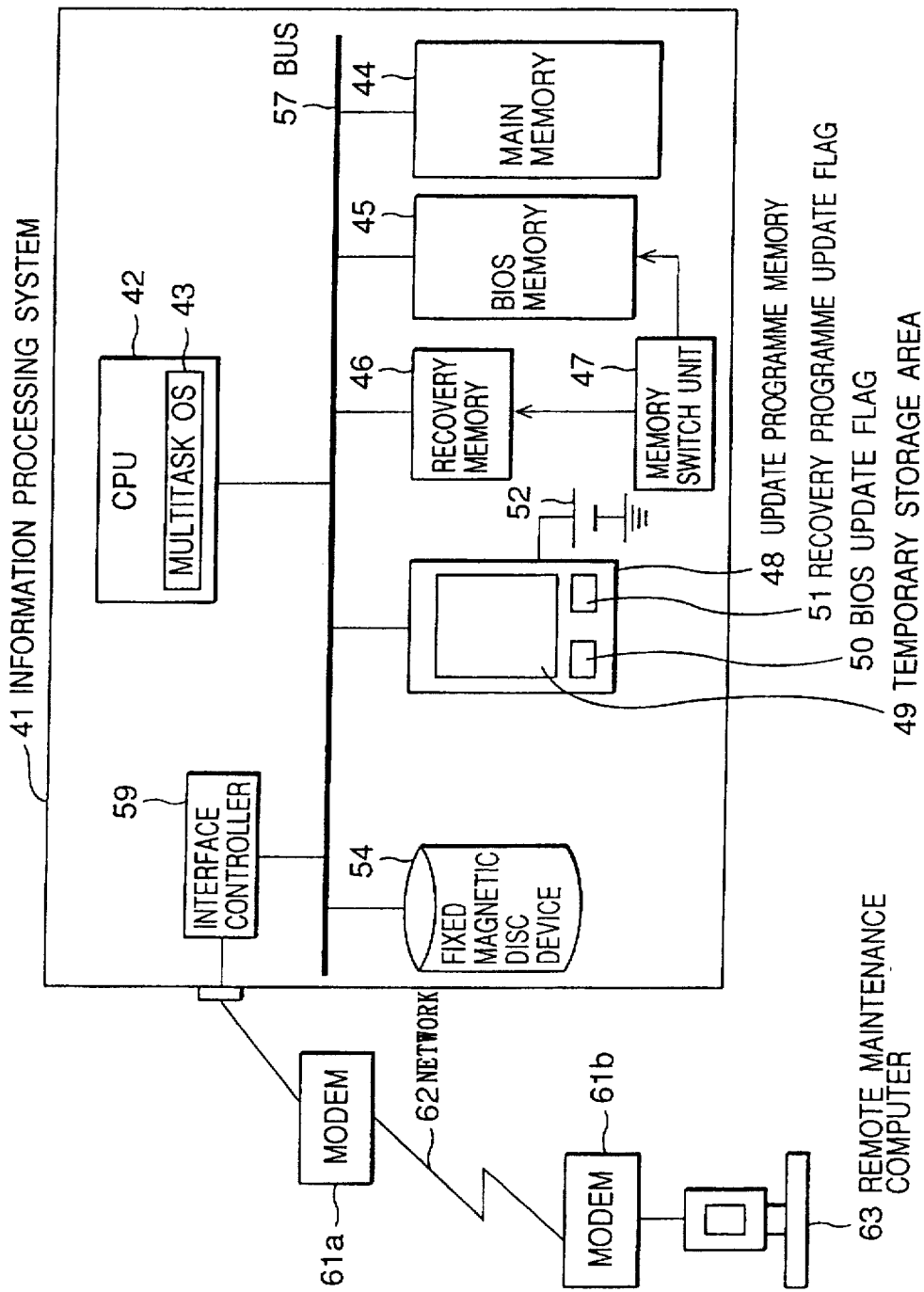
FIG. 13 is a functional block diagram showing a structure of an information processing system according to a fourth embodiment of the present invention.

FIG. 13 shows an information processing system according to a fourth embodiment of the present invention. This information processing system is similar to that described in conjunction with the first embodiment except that an interface controller 59 such as RS323C is provided in place of the flexible disc device 53, the CRT 55, and the keyboard 56. In this embodiment, a remote maintenance computer 63 is connected to the information processing system 41 through a modem 61a, a communication network 62, and a modem 61b. The new basic input/output system programme and the new recovery programme are supplied from the remote maintenance computer 63 to the information processing system 41 through this interface controller 59. To update the basic input/output system programme or the recovery programme, an operator loads a flexible disc in which a new basic input/output system programme or a new basic input/output system programme is recorded by using a flexible disc device or the like accompanying to the remote maintenance computer 63. In addition, the operator transmits the new basic input/output system programme or the new recovery programme to the information processing system 41 through the modem 61b, the communication network 62 and the modem 61a by means of entering commands through a keyboard accompanying to the remote maintenance computer 63. The information processing system 41 receives the programme through the interface controller 59. The information processing system 41 then stores the received programme into the temporary storage area 49 in the update programme memory 48. In addition, the information processing system 41 sets either the BIOS update flag 50 or the recovery programme update flag 51 according to whether the transmitted programme is the basic input/output system programme or the recovery programme. Other functions and operations are similar to those described in conjunction with the first embodiment.

Fifth Embodiment

Figure 14:
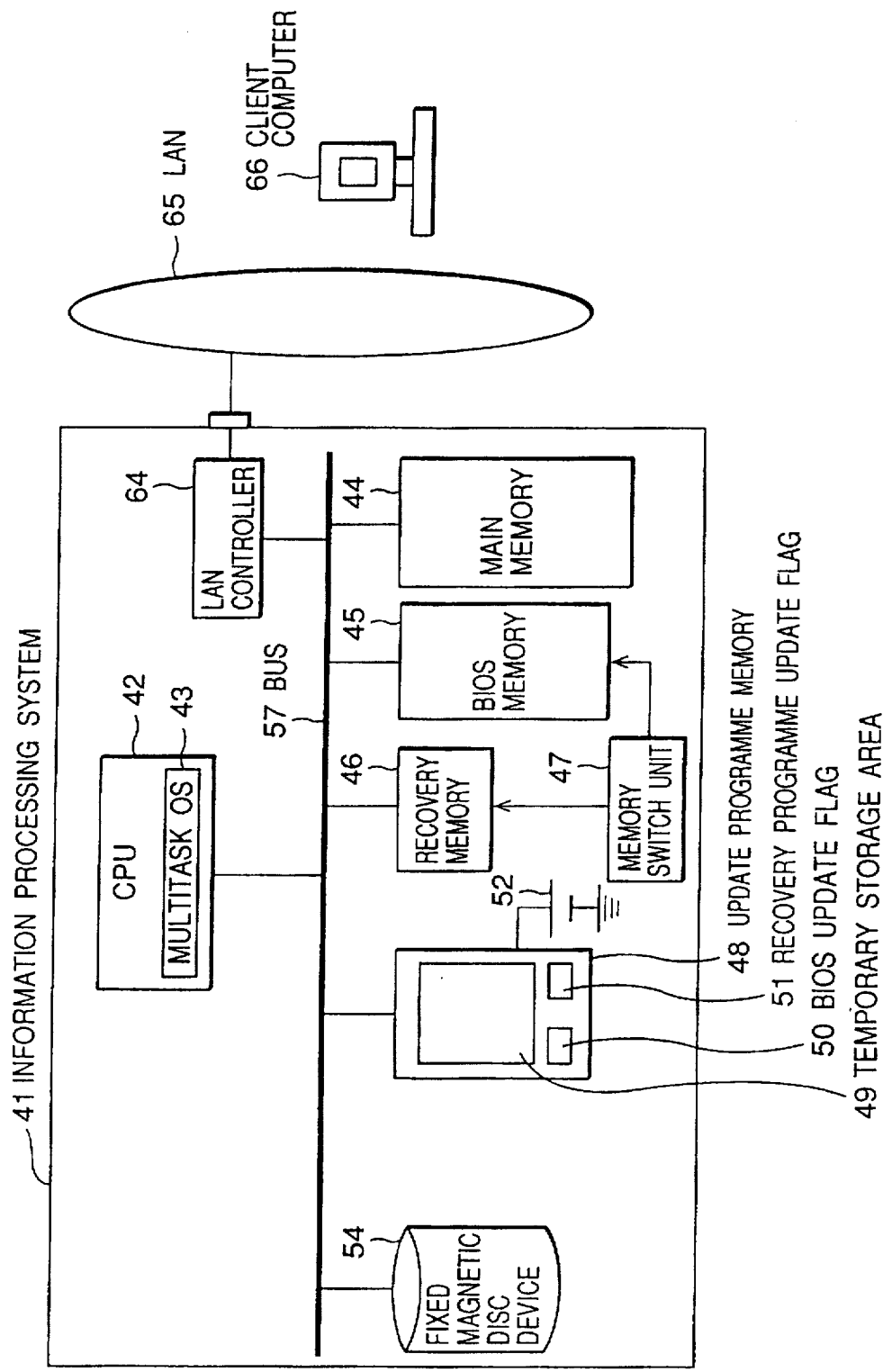
FIG. 14 is a functional block diagram showing a structure of an information processing system according to a fifth embodiment of the present invention.

FIG. 14 shows an information processing system according to a fifth embodiment of the present invention. This information processing system is similar to that described in conjunction with the first embodiment except that a local area network (LAN) controller 64 is provided to communicate with LAN in place of the flexible disc device 53, the CRT 55, and the keyboard 56. In this embodiment, the new basic input/output system programme and the new recovery programme are supplied from a client computer 66 to the information processing system 41 through a LAN 65 and the LAN controller 64. To update the basic input/output system programme or the recovery programme, an operator loads a flexible disc in which a new basic input/output system programme or a new basic input/output system programme is recorded by using a flexible disc device or the like accompanying to the client computer 66. In addition, the operator transmits the new basic input/output system programme or the new recovery programme to the information processing system 41 by means of entering commands through a keyboard accompanying to the client computer 66. The new basic input/output system programme or the new recovery programme is thus sent to the information processing system 41 through the LAN 65. The information processing system 41 receives the programme through the LAN controller 64. The information processing system 41 then stores the received programmes into the temporary storage area 49 in the update programme memory 48. In addition, the information processing system 41 sets either the BIOS update flag 50 or the recovery programme update flag 51 according to whether the transmitted programme is the basic input/output system programme or the recovery programme. Other functions and operations are similar to those described in conjunction with the first embodiment.

Sixth Embodiment

Figure 15:
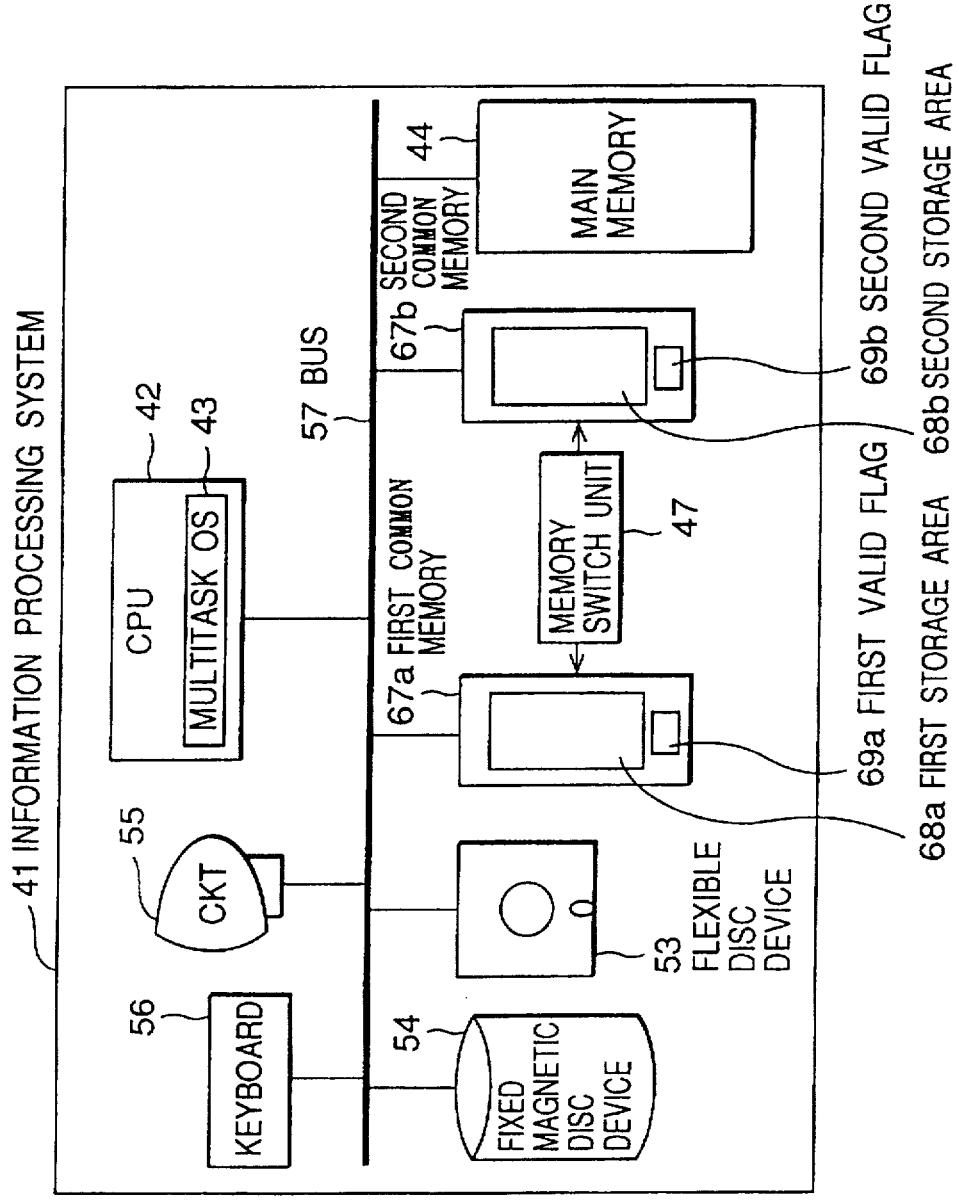
FIG. 15 is a functional block diagram showing a structure of an information processing system according to a sixth embodiment of the present invention.

FIG. 15 shows an information processing system according to a sixth embodiment of the present invention. This information processing system is similar to that described in conjunction with the first embodiment except that a common memory is provided for storing both the basic input/output system programmes and the recovery programmes in place of the update programme memory 48 in FIG. 5. As the common memory, first and second common memories are provided to ensure alternate storing of new programmes. As shown in FIG. 15, the information processing system 41 comprises first and second common memories 67a and 67b, first and second storage areas 68a and 68b, and first and second valid flags 69a and 69b. The first and the second storage areas 68a and 68b are part of the first and the second common memories 67a and 67b, respectively. Likewise, the first and the second valid flags 69a and 69b are part of first and second common memories 67a and 67b, respectively, and are indicative of the common memory in which the newer basic input/output system or recovery programme is stored. The first and the second common memories 67a and 67b are non-volatile memories such as flash memories, of which contents may be rewritten on the board.

Figure 16:
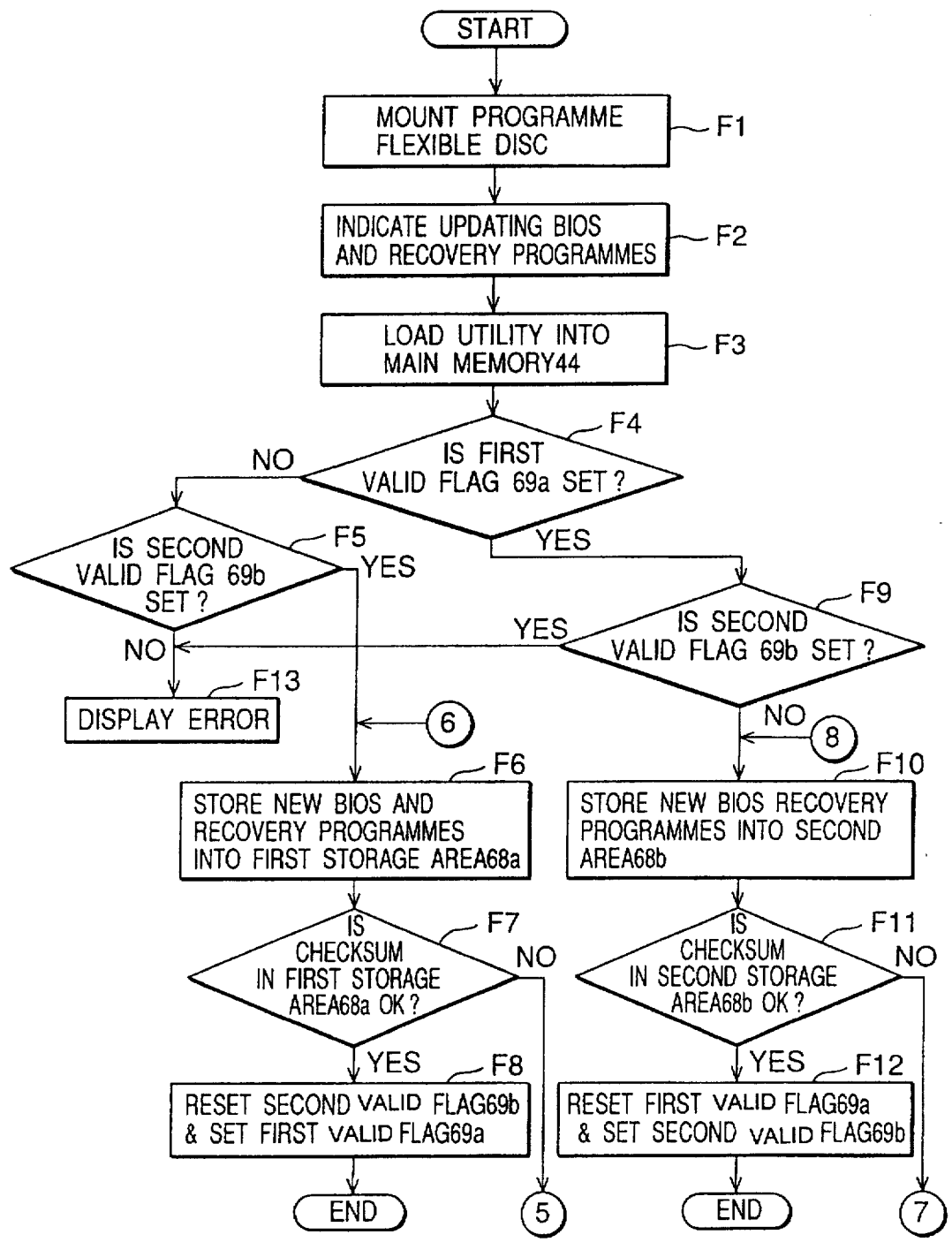
FIG. 16 is a flow chart illustrating operation in supplying new basic input/output system and recovery programmes to a common memory according to the sixth embodiment of the present invention.
Figure 18:
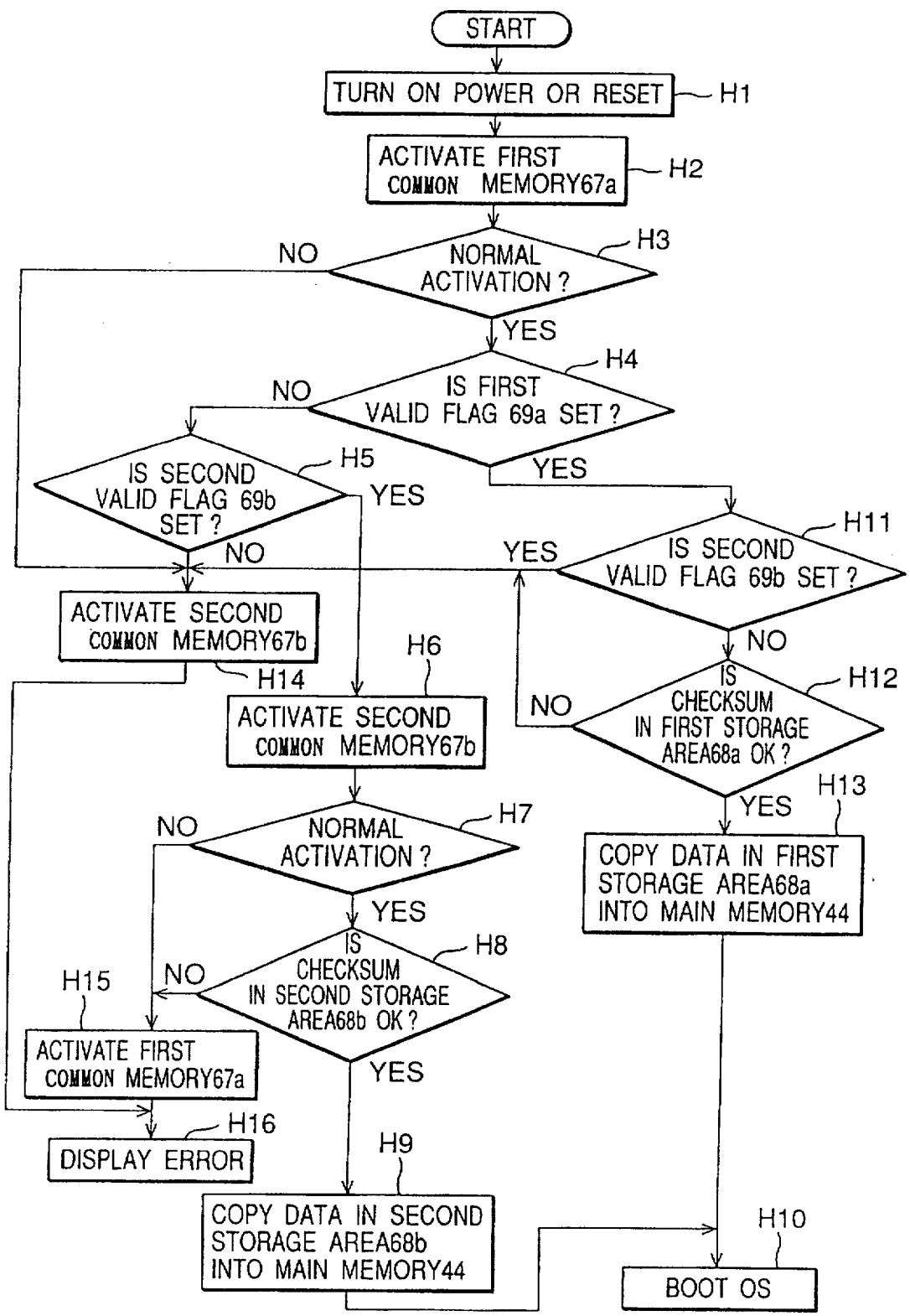
FIG. 18 is a flow chart illustrating operation in turning on the power of the information processing system or resetting it according to the sixth embodiment of the present invention.

Operation of the information processing system according to this embodiment is described in conjunction with flow charts illustrated in FIGS. 16 through 18. FIG. 16 is a flow chart illustrating operation in loading the new basic input/output system programme and the new recovery programme into the common memory without turning off the power of the information processing system 41 or resetting the information processing system 41. FIG. 17 is a flow chart illustrating operation in retrying to supply the basic input/output system programme and the recovery programme to the memory when an error is occurred in storing the basic input/output system programme and the recovery programme in the flow chart in FIG. 16. FIG. 18 is a flow chart illustrating operation in turning on the power of the information processing system 41 or resetting the same.

To update the basic input/output system programme and the recovery programme, a newer basic input/output system programme and a newer recovery programme are supplied, in operation of the system, to the common memory containing the old programmes in a manner described below according to the flow chart in FIG. 16. In this event, the processing is carried out on the multitask operating system 43, so that it is unnecessary to down the system. At step F1, the update flexible disc is loaded into the flexible disc device 53 which the flexible disc contains utility programmes for use in updating the basic input/output system programme and the recovery programme as well as a new basic input/output system programme and a new recovery programme. At step F2, an operator indicates through the keyboard 56 to update the basic input/output system programme and the recovery programme. More specifically, the operator enters through the keyboard commands for use in loading the utility programmes to update the basic input/output system programme and the recovery programme. A mouse (not shown) may be used as the input device in place of the keyboard 56. In such a case, the operator enter commands through the mouse.

At step F3, the command interpreter issues a call to the system to load and execute the utility programme(s) indicated by the operator. More specifically, the command interpreter issues a call to functions of loading and executing the application programme provided by the multitask operating system 43. In response to this, the multitask operating system 43 in operation loads the utility programmes from the flexible disc device 53 to the main memory 44 in a time sharing manner without stopping the other application programmes in the course of operation. Thereafter, the utility programmes are operated on the multitask operating system 43.

At step F4, the first common memory 67a is designated by the memory switch unit 47 to check the first valid flag 69a. As apparent from the following description, the storage area of the common memory for which the valid flag is set stores newer basic input/output system programme and recovery programme. More specifically; the newer basic input/output system programme and the newer recovery programme are stored in the first storage area 68a in the first common memory 67a when the first valid flag 69a is set. Likewise, the newer basic input/output system programme and the newer recovery programme are stored in the second storage area 68b in the second common memory 67b when the second valid flag 69b is set. If it is determined at step F4 that the first valid flag 69a is set, then step F9 is carried out. If it is determined at step F4 that the first valid flag 69a is not set, step F5 is carried out. When it is determined at step F4 that the first valid flag 69a is not set, then step F5 is executed to designate the second common memory 67b by the memory switch unit 47. It is then determined whether the second valid flag 69b is set. If it is determined that the second valid flag 69b is not set, step F13 is carried out to display an error message on the CRT 65 and then stop the operation of the information processing system 41 because it is impossible to achieve recovery.

If it is determined at step F5 that the second valid flag 69b is set, the first common memory 67a is designated at step F6 by the memory switch unit 47 to read the new basic input/output system programme and the new recovery programme out of the flexible disc and store them in the first storage area 68a where they are stored. Next, at step F7, the checksum test is performed on the basic input/output system programme and the recovery programme stored in the first storage area 68a to check the storing operation for legality. When the checksum test is terminated normally, designation to the first and the second common memories is switched at step F8 by the memory switch unit 47 to reset the second valid flag 69a and set the first valid flag 69b. On the other hand, if it is determined at step F4 that the first valid flag 69a is set, steps F9 through F12 are carried out. Steps F9 through F12 are similar in operation to steps F5 through F8, respectively, expect that the associated. common memories are different from those in steps F5 through F8. More specifically, the second common memory 67b is designated at step F9 by the memory switch unit 47. The second common memory 67b is validated and the second valid flag 69b is checked. If it is determined at step F9 that the second valid flag 69b is set, step F13 is carried out to display an error message on the CRT 65 and stop the operation of the information processing system 41 because it is impossible to achieve recovery. If it is determined at step F9 that the second valid flag 69b is not set, step F10 is carried out to designate the second common memory 67b by the memory switch unit 47. The second common memory 67b is hence validated. Subsequently, the new basic input/output system programme and the new recovery programme are read out of the flexible disc and are stored in the second storage area 68b. Subsequently, at step F11, the checksum test is performed on the basic input/output system programme and the recovery programme stored in the second storage area 68b to check the storing operation for legality. When the checksum test is terminated normally, designation to the second and the first common memories is switched at step F12 to reset the first valid flag 69a and set the second valid flag 69b.

Next, retry operation is described with reference to FIG. 17. This operation is carried out when there is an error occurred during the checksum test performed at steps F7 and F11. When there is an error occurred during the checksum test performed at step F7, the number of retry cycles is determined at step G1. In this event, it is determined whether the number of retry cycles is larger than a predetermined value (such as ten). If the number of the retry cycles is smaller than the predetermined number, the new basic input/output system programme and the new recovery programme are again read out of the flexible disc. Subsequently, the control returns to step F6 where the programmes are stored in the BIOS storage area. On the contrary, if it is determined at step G1 that the predetermined number of retry cycles are failed, an error message is displayed on the CRT 65 at step G2 to stop the operation of the information processing system 41. When there is an error occurred during the checksum test performed at step F11, the number of retry cycles is determined at step G3. In this event, it is determined whether the number of retry cycles is larger than a predetermined value (such as ten). If the number of the retry cycles is smaller than the predetermined number,. the new basic input/output system programme and the new recovery programme are again read out of the flexible disc. Subsequently, the control returns to step F10 where the programmes are stored in the BIOS storage area. On the contrary, if it is determined at step G3 that the predetermined number of retry cycles are failed, an error message is displayed on the CRT 65 at step G4 to stop the operation of the information processing system 41.

Next, operation in turning on the power of the information processing system 41 or resetting it according to this embodiment is described with reference to FIG. 18.

When the information processing system 41 is turned on or reset at step H1, the first common memory 67a is designated by the memory switch unit 47 at step H2 to activate the first common memory 67a. At step H3, the memory switch unit 47 monitors initiation of the processing with the first common memory 67a activated. If it is determined at step H3 that the first common memory 67a is activated normally, then step H4 is carried out. On the other hand, if it is determined at step H3 that the first common memory 67a is not activated normally, step H14 is carried out. When the first common memory 67a is activated normally, it is determined at step H4 whether the first valid flag 69a is set. As mentioned above, the newer basic input/output system programme and recovery programme are stored in the storage area of the common memory to which the flag is set. If it is determined at step H4 that the first valid flag 69a is not set, step H5 is carried out. If it is determined that the first valid flag 69a is set, then step H11 is carried out.

If it is determined at step H4 that the first valid flag 69a is not set, the second common memory 67b is designated at step H5 by the memory switch unit 47. The second valid flag 69b is then checked. It is necessary to continue operation of the information processing system after the memories are switched to each other, so that parts of the basic input/output system programme and the recovery programme stored in the first storage area 68a are same as those in the second storage area 68b. If it is determined at step H5 that the second valid flag 69b is set, step H6 is carried out. On the other hand, if it is determined at step H5 that the second valid flag 29b is not set, step H14 is carried out.

At step H6, the second common memory 67b is designated by the memory switch unit 47 to activate the second common memory 67b. At step H7, the memory switch unit 47 monitors initiation of the processing with the second common memory 67b activated. At step H8, the checksum test is performed on the basic input/output system programme and the recovery programme stored in the second storage area 68b to check the storing operation for legality. Step H9 is carried out if it is determined at steps H7 and H8 that there is no error caused. If the checksum test is terminated normally at step H8, then the contents in the second storage area 68b are copied into the main memory 44 at step H9. The operation is then continued on the main memory 44 (shadowing). In addition, at step H10, the multitask operating system 43 is booted from the fixed magnetic disc device 54.

If it is determined at step H4 that the first valid flag 69a is set, step H11 is carried out to designate the second common memory 67b by the memory switch unit 47. The second valid flag 69b is then checked. If it is determined that the second valid flag 69b is not set, step H12 is carried out to perform the checksum test for the basic input/output system programme and the recovery programme stored in the first storage area 68a to check the storing operation for legality. If the checksum test is terminated normally, the contents in the first storage area 68a are copied into the main memory 44 at step H12. The operation is then continued on the main memory 44 (shadowing).

On the other hand, if steps H3 and H5 are negative, step H14 is carried out to designate the second common memory 67b by the memory switch unit 47, thereby activating the second common memory 67b. If steps H7 and H8 are negative, step H15 is carried out to designate the first common memory 67a by the memory switch unit 47, thereby activating the first common memory 67a. Steps H14 or H15 corresponds to status where no recovery can be achieved. Accordingly, an error message is displayed on the CRT 65 at step H16 to stop the operation of the information processing system 41.

Seventh Embodiment

Figure 19:
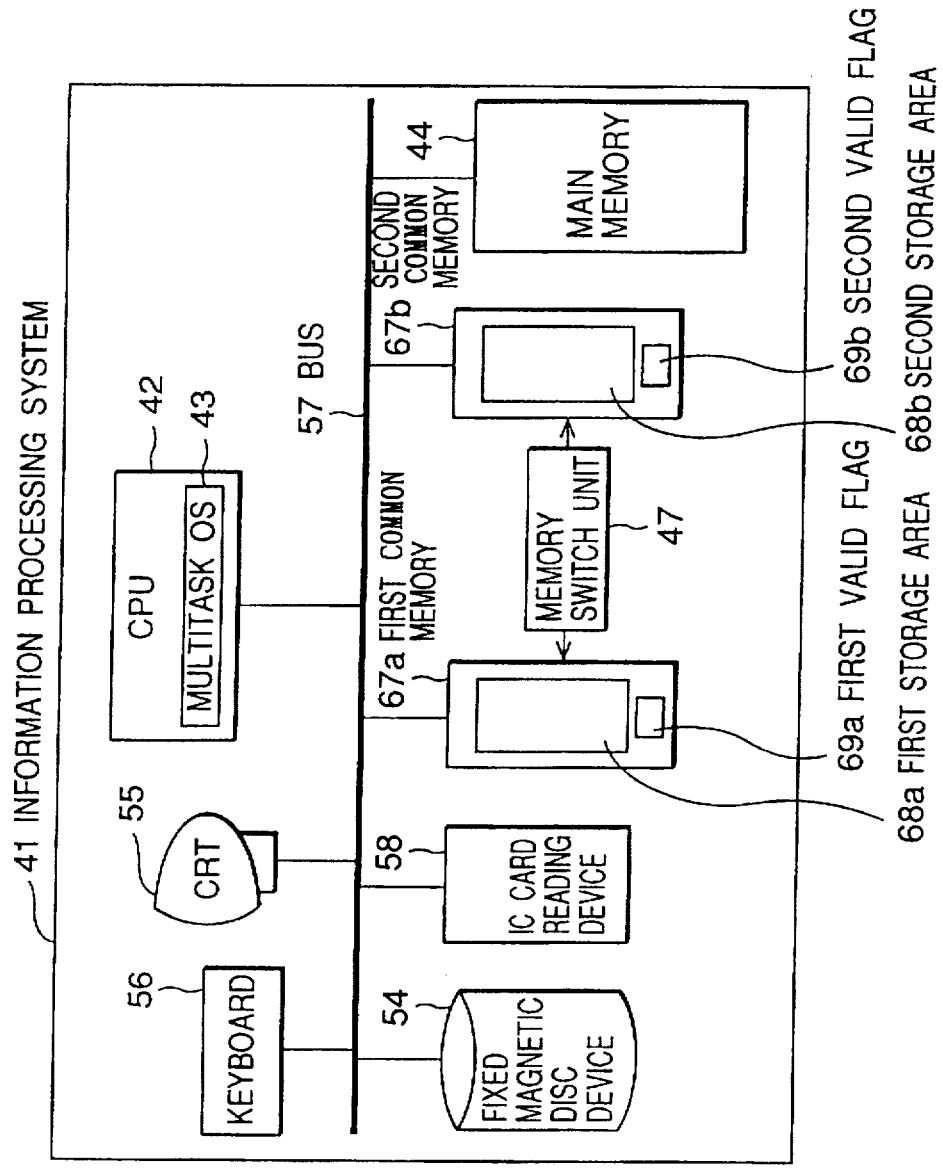
FIG. 19 is a functional block diagram showing a structure of an information processing system according to a seventh embodiment of the present invention.

FIG. 19 shows an information processing system according to a seventh embodiment of the present invention. This information processing system is similar to that described in conjunction with the sixth embodiment except that an IC card reading device 58 is provided in place of the flexible disc device 53 to permit entrance of a new basic input/output system programme and a new recovery programme from an IC card. In this event, the new basic input/output system programme and the new recovery programme are recorded on the IC card. In the processes in FIG. 16, an operator inserts the IC card into the IC card reading device 58. Other operations and functions are similar to those described in conjunction with the sixth embodiment.

Eighth Embodiment

Figure 20:
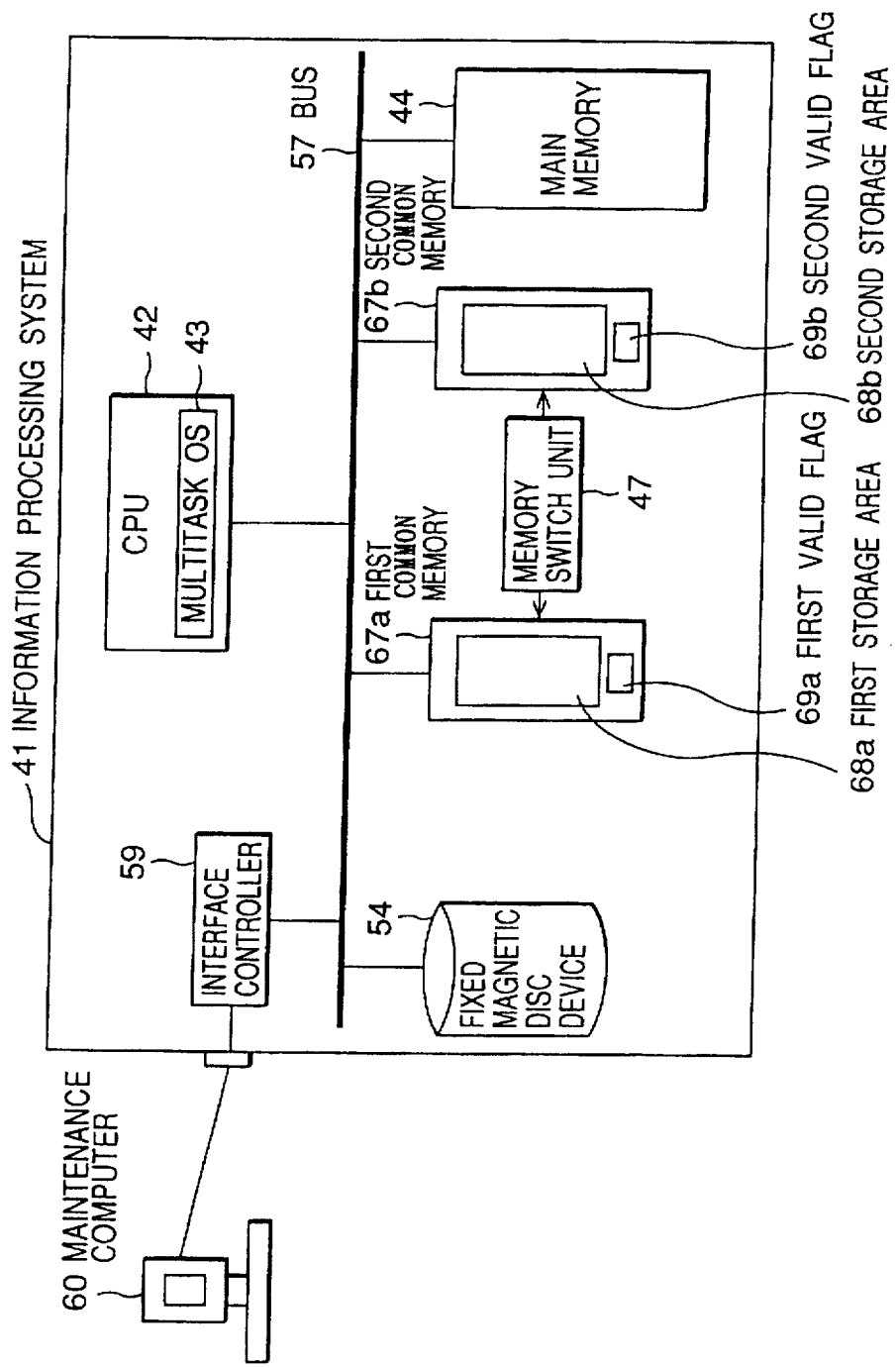
FIG. 20 is a functional block diagram showing a structure of an information processing system according to an. eighth embodiment of the present invention.

FIG. 20 shows an information processing system according to an eighth embodiment of the present invention. This information processing system is similar to that described in conjunction with the sixth embodiment except that an interface controller 59 such as RS323C is provided in place of the flexible disc device 53, the CRT 55, and the keyboard 56. In this embodiment, the new basic input/output system programme and the new recovery programme are supplied from a maintenance computer 60 to the information processing system 41 through this interface controller 59. To update the basic input/output system programme or the recovery programme, an operator loads a flexible disc in which a new basic input/output system programme or a new basic input/output system programme is recorded by using a flexible disc device or the like accompanying to the maintenance computer 60. In addition, the operator transmits the new basic input/output system programme or the new recovery programme to the information processing system 41 by means of entering commands through a keyboard accompanying to the computer 60. The new basic input/output system programme or the new recovery programme is thus sent to the information processing system 41. The information processing system 41 receives it through the interface controller 59. The information processing system 41 then stores the received programme into the storage area in the first common memory 67a or the second common memory 67b according to the steps at and after F4 in FIG. 16. In addition, the information processing system 41 sets either the first valid flag 69a or the second valid flag 69b according to whether the transmitted programme is stored in the first common memory 67a or in the second common memory 67b. Other functions and operations are similar to those described in conjunction with the sixth embodiment.

Ninth Embodiment

Figure 21:
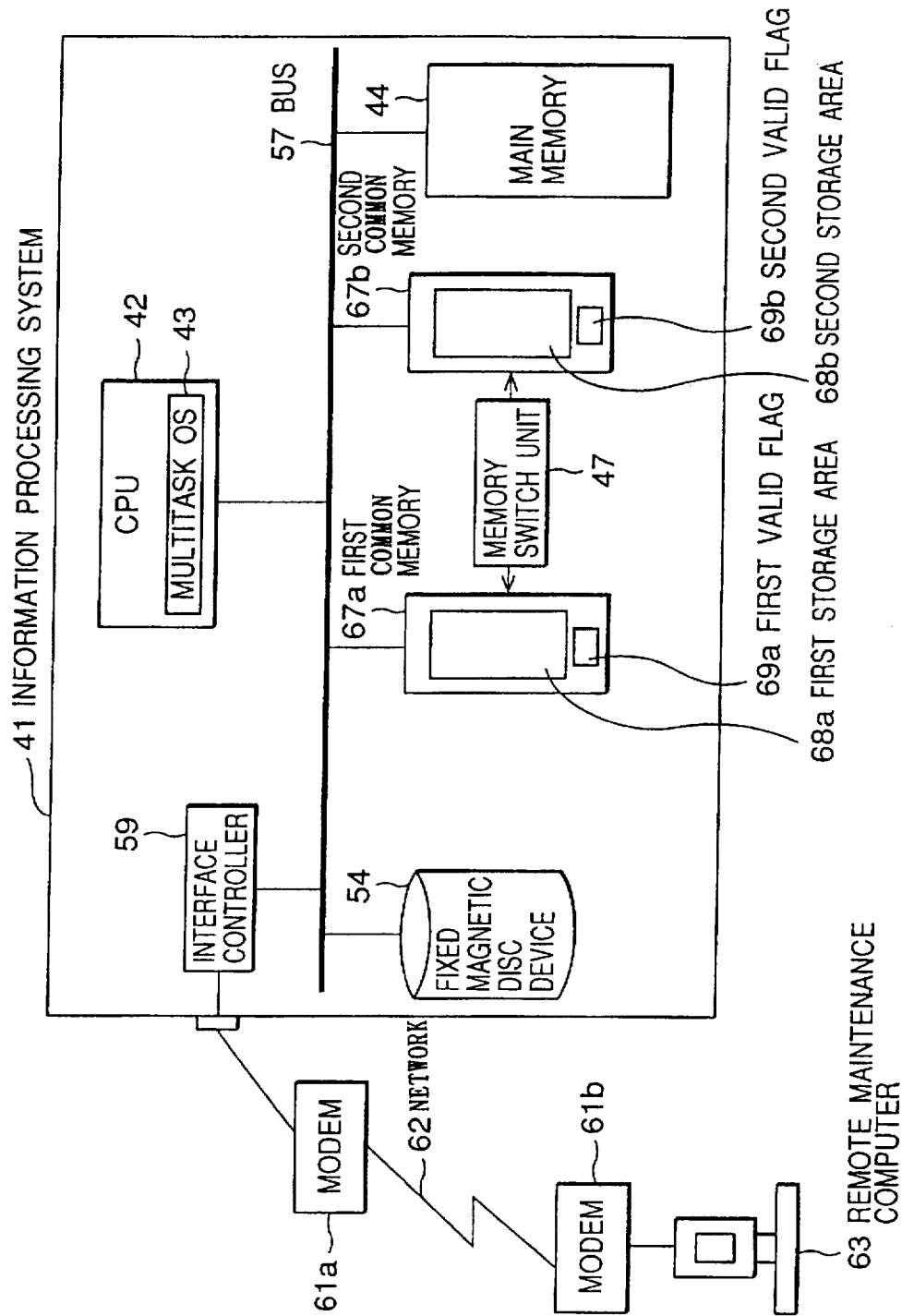
FIG. 21 is a functional block diagram showing a structure of an information processing system according to a ninth embodiment of the present invention.

FIG. 21 shows an information processing system according to a ninth embodiment of the present invention. This information processing system is similar to that described in conjunction with the sixth embodiment except that an interface controller 59 such as RS323C is provided in place of the flexible disc device 53, the CRT 55, and the keyboard 56. In this embodiment, a remote maintenance computer 63 is connected to the information processing system 41 through a modem 61a, a communication network 62, and a modem 61b. The new basic input/output system programme and the new recovery programme are supplied from the remote maintenance computer 63 to the information processing system 41 through this interface controller 59. To update the basic input/output system programme or the recovery programme, an operator loads a flexible disc in which a new basic input/output system programme or a new basic input/output system programme is recorded by using a flexible disc device or the like accompanying to the remote maintenance computer 63. In addition, the operator transmits the new basic input/output system programme or the new recovery programme to the information processing system 41 through the modem 61b, the communication network 62 and the modem 61a by means of entering commands through a keyboard accompanying to the remote maintenance computer 63. The information processing system 41 receives the programme through the interface controller 59. The information processing system 41 then stores the received programme into the storage area in the first common memory 67a or the second common memory 67b according to the steps at and after F4 in FIG. 16. In addition, the information processing system 41 sets either the first valid. flag 69a or the second valid flag 69b according to whether the transmitted programme is stored in the first common memory 67a or in the second common memory 67b. Other functions and operations are similar to those described in conjunction with the sixth embodiment.

Tenth Embodiment

Figure 22:
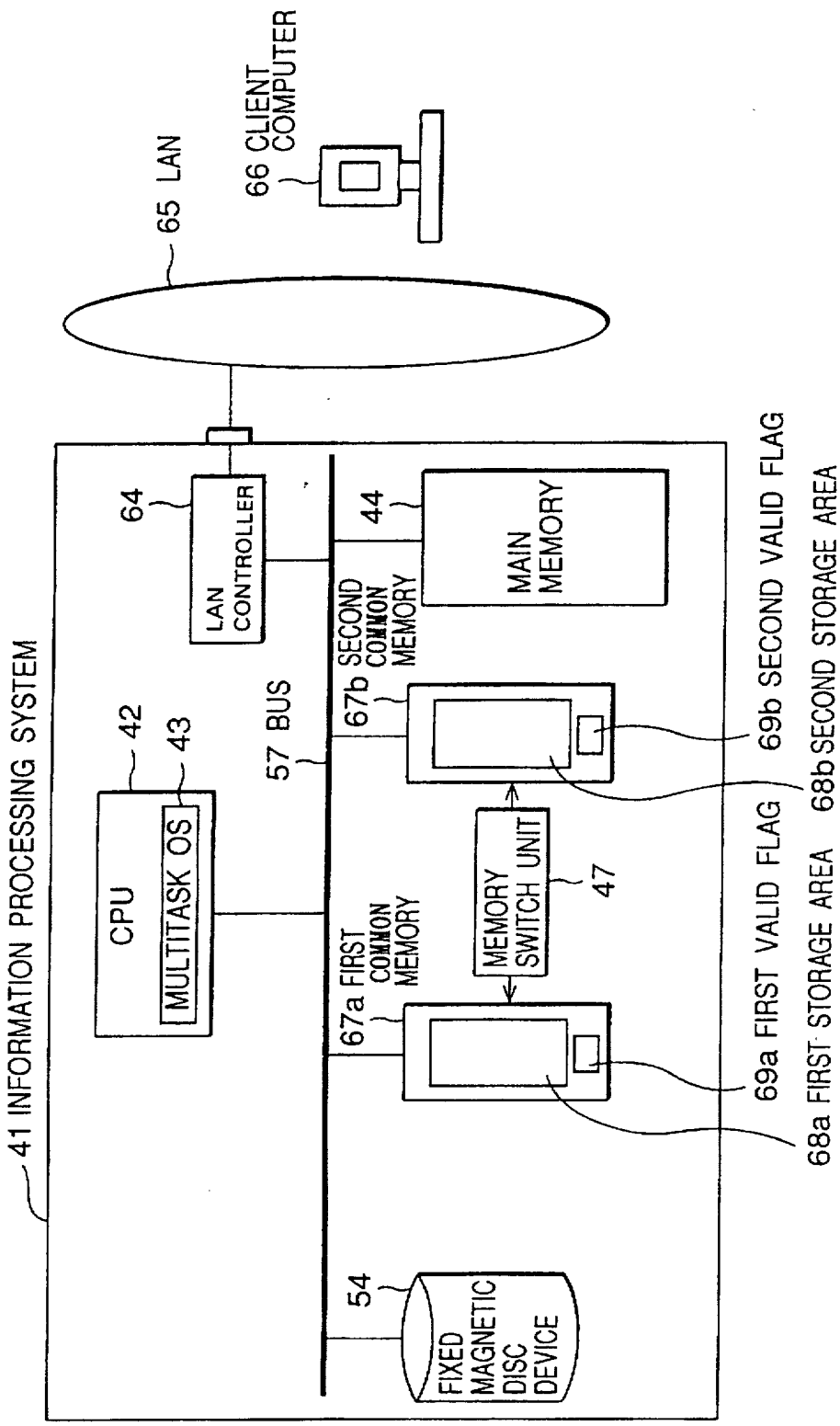
FIG. 22 is a functional block diagram showing a structure of an information processing system according to a tenth embodiment of the present invention.

FIG. 22 shows an information processing system according to a tenth embodiment of the present invention. This information processing system is similar to that described in conjunction with the sixth embodiment except that a local area network (LAN) controller 64 is provided to communicate with LAN in place of the flexible disc device 53, the CRT 55, and the keyboard 56. In this embodiment, the new basic input/output system programme and the new recovery programme are supplied from a client computer 66 to the information processing system 41 through a LAN 65 and the LAN controller 64. To update the basic input/output system programme or the recovery programme, an operator loads a flexible disc in which a new basic input/output system programme or a new basic input/output system programme is recorded by using a flexible disc device or the like accompanying to the client computer 66. In addition, the operator transmits the new basic input/output system programme or the new recovery programme to the information processing system 41 by means of entering commands through a keyboard accompanying to the client computer 66. The new basic input/output system programme or the new recovery programme is thus sent to the information processing system 41 through the LAN 65. The information processing system 41 receives the programme through the LAN controller 64. The information processing system 41 then stores the received programme into the storage area in the first common memory 67a or the second common memory 67b according to the steps at and after F4 in FIG. 16. In addition, the information processing system 41 sets either the first valid flag 69a or the second valid flag 69b according to whether the transmitted programme is stored in the first common memory 67a or in the second common memory 67b. Other functions and operations are similar to those described in conjunction with the sixth embodiment.

Eleventh Embodiment

Figure 23:
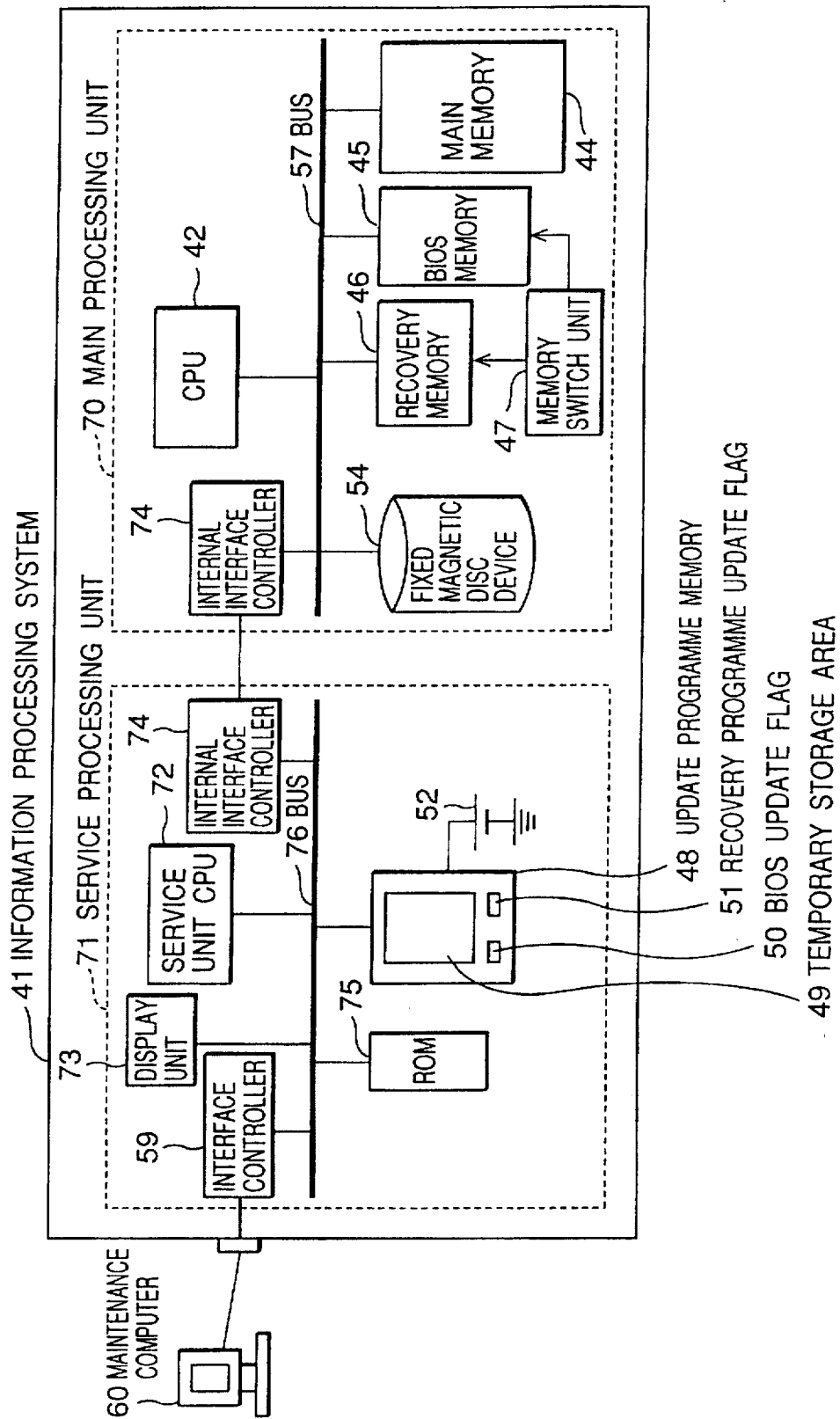
FIG. 23 is a functional block diagram showing a structure of an information processing system according to an eleventh embodiment of the present invention.

Referring to FIG. 23, an information processing system 41 according to an eleventh embodiment of the present invention is described. The information processing system 41 comprises a main processing unit 70 and a service processing unit 71. The service processing unit 71 is connected to a maintenance computer 60. A feature of this embodiment is that the service processing unit 71 and the maintenance computer 60 are separately provided. The basic input/output system programmes, operating systems, and application programmes are operated on the main processing unit 70. The service processing unit 71 is for providing services such as diagnosis and maintenance to the main processing unit 70. The information processing unit 41 also comprises a central processing unit (CPU) 42 in the main processing unit, a main memory 44, a BIOS memory 45, a recovery memory 46, a memory switch unit 47, a fixed magnetic disc device 54 in the main processing unit 70, internal interface controllers 74, and a bus 57. The internal interface controllers 34 are for use in ensuring intercommunication between the main processing unit 70 and the service processing unit 71. The bus 57 is for connecting the elements in the main processing unit 70 with each other.

The service processing unit 71 comprises a central processing unit for the service processing unit 71 (hereinafter, referred to as a service processing unit CPU) 62, an update programme memory 48, a battery 52, a non-volatile memory 75 (hereinafter, also called ROM), a display unit 73, an interface controller 59, and a bus 76. The update programme memory 48 is formed of a static RAM. The battery 52 is used to retain the data in the update programme memory 48 after the information processing system 41 has been turned off. The ROM 75 stores programmes (including system programme for the service processing unit 71) describing operations of the service processing unit 71, i.e., operations of the service processing unit CPU. The display unit 43 displays information thereon according to instructions supplied from the service unit CPU 72 in the service processing unit 71. The interface controller 59 is for ensuring communication between the service processing unit 71 and the maintenance computer 60. The bus 76 are for interconnecting the elements in the service processing unit 71 with each other.

The update programme memory 48 comprises a temporary storage area 49, a BIOS update flag 50, and a recovery programme update flag 51. The temporary storage area 49 is for use in storing temporarily a new basic input/output system programme or a new recovery programme. The BIOS update flag 50 indicates status where a new basic input/output system programme is stored in the temporary storage area 49 and has not yet transferred to the main processing unit 70. Likewise, the recovery programme update flag 51 indicates status where a new recovery programme is stored in the temporary storage area 49 and has not yet transferred to the main processing unit 70.

The maintenance computer 60 is connected to the service processing unit 71 through the interface controller 59 and is responsible for user interfaces.

As will be described below, the update programme memory 48 in this embodiment comprises the BIOS update flag 50 which is set upon updating the basic input/output system programme. A new basic input/output system programme is transferred to the temporary storage area 49 to the BIOS memory 45 only when the BIOS update flag 50 is set upon initialization of the system. However, the BIOS update flag 50 may be omitted if required. In such a case, the new basic input/output system programme is stored in the temporary storage area 49 in the update programme memory 48 may be transferred therefrom to the BIOS memory 45 whenever the system is initialized. This structure causes, however, an overhead involved in the transference.

In this embodiment, the BIOS update flag 10 is reset when the new basic input/output system programme is transferred from the temporary storage area 49 to the BIOS memory 45 upon initialization of the system. However, the BIOS update flag 50 may be set when the basic input/output system programme is updated rather than when it is transferred. In this event, it is possible to at least reduce the above mentioned overhead because transference can be omitted until an update operation is performed first.

Figure 24:
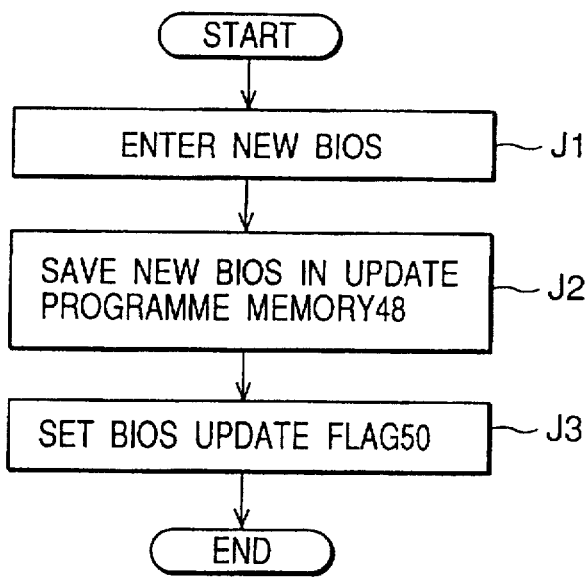
FIG. 24 is a flow chart illustrating operation in entering a new basic input/output system programme according to the eleventh embodiment of the present invention.
Figure 25:
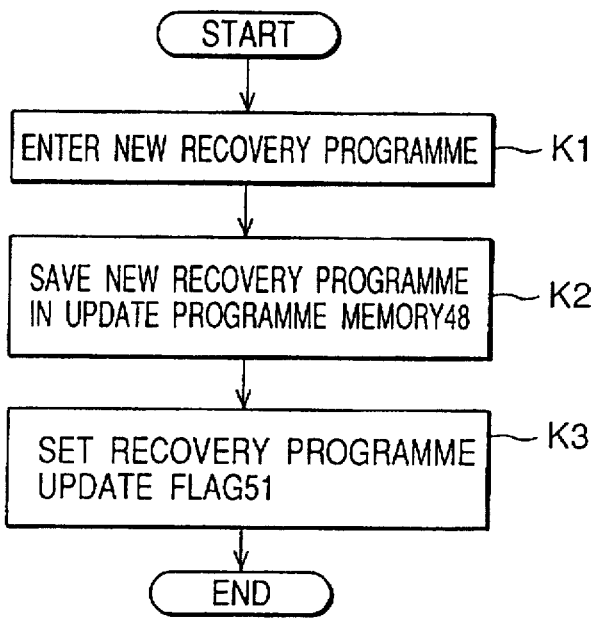
FIG. 25 is a flow chart illustrating operation in entering a new recovery programme according to the eleventh embodiment of the present invention.
Figure 26:
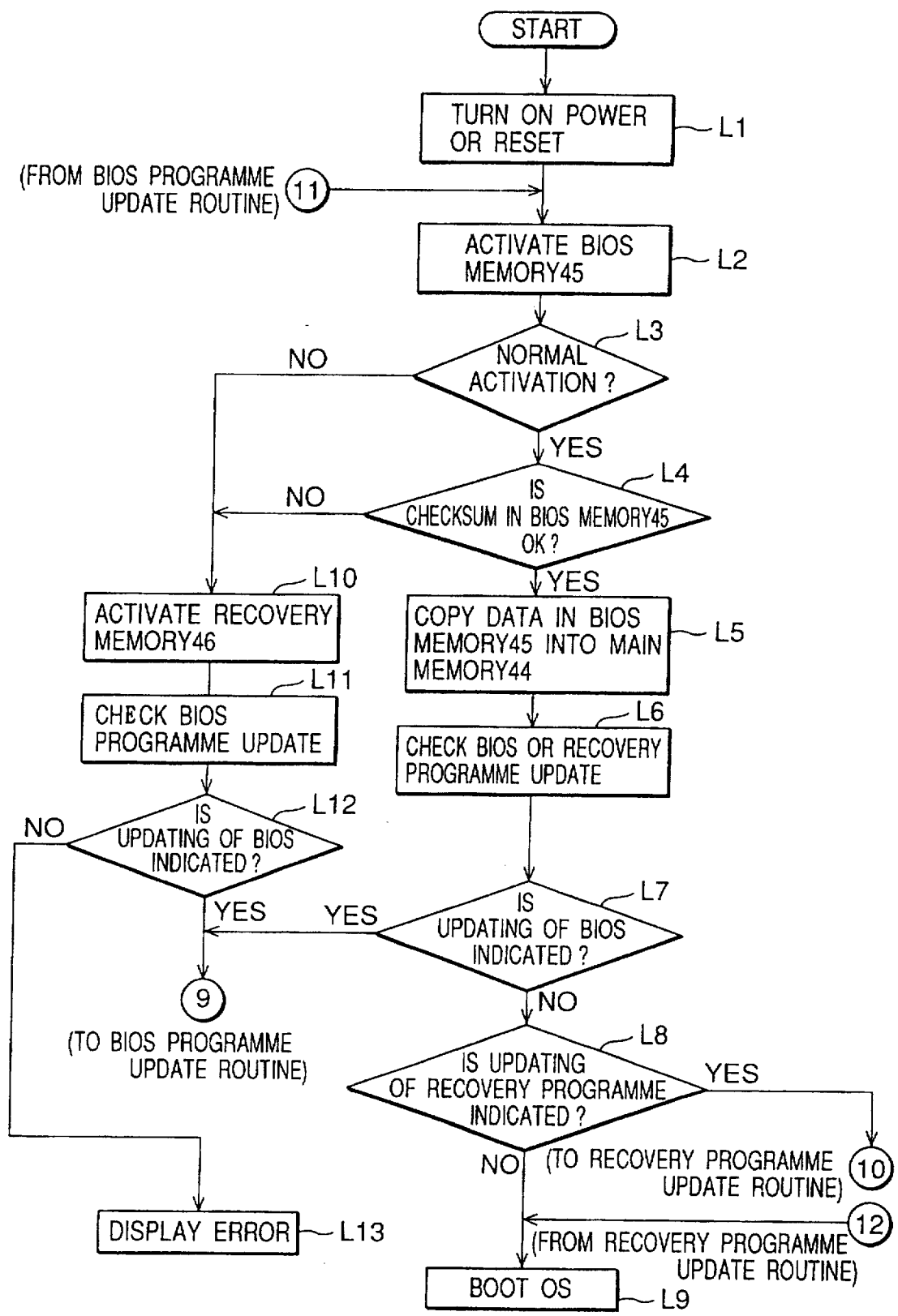
FIG. 26 is a flow chart illustrating operation in turning on the power of the information processing system or after resetting it according to the eleventh embodiment of the present invention.
Figure 27:
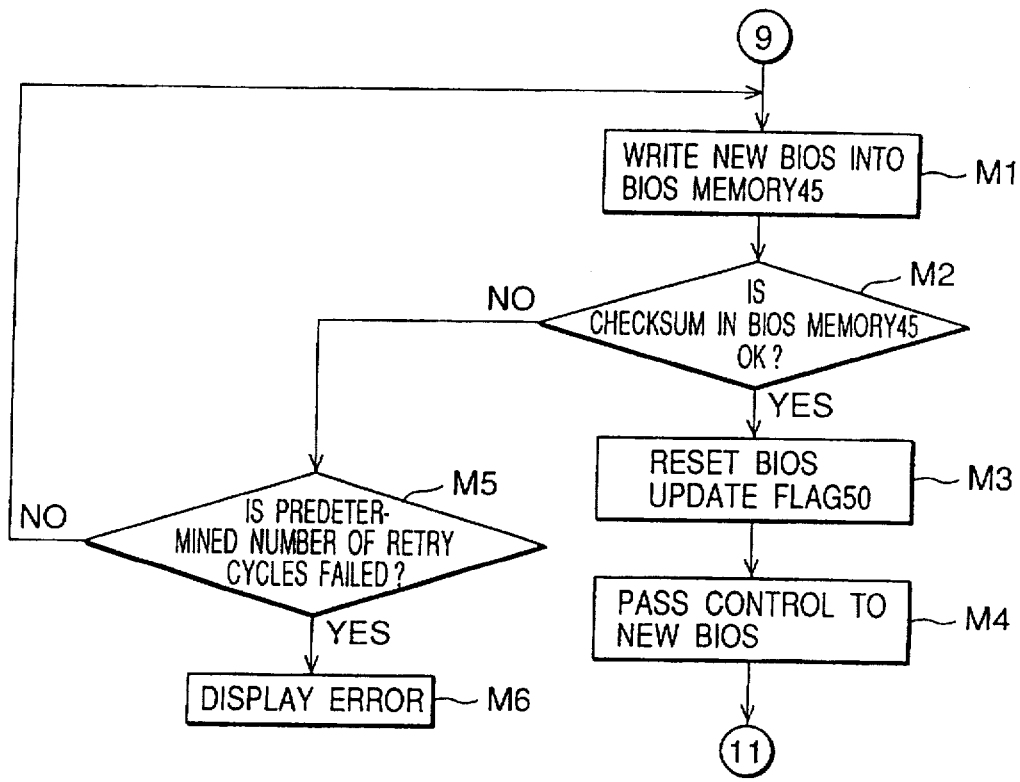
FIG. 27 is a flow chart illustrating operation in updating basic input/output system programmes according to the eleventh embodiment of the present invention.
Figure 28:
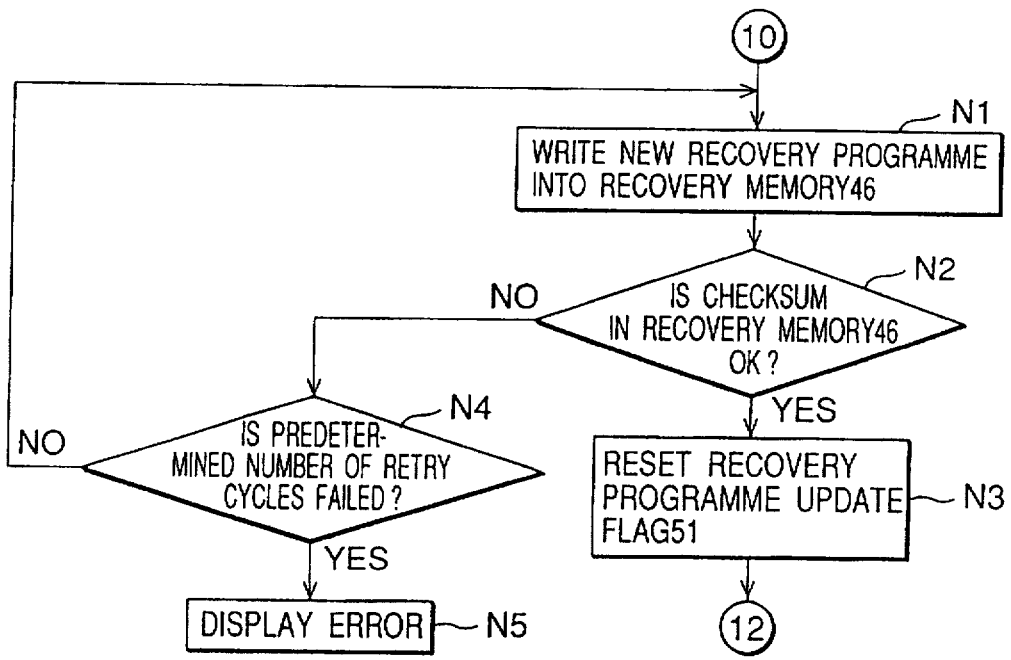
FIG. 28 is a flow chart illustrating operation in updating recovery programmes according to the eleventh embodiment of the present invention.

Operation of the information processing system 41 according to this embodiment is described with reference to flow charts in FIGS. 24 through 28. FIG. 24 is a flow chart for use in describing operation of supplying a new basic input/output system programme from the maintenance computer without requiring neither to turn off the power for the information processing system 41 nor to reset the information processing system 41. FIG. 25 is a flow chart for use in describing operation of supplying a new recovery programme from the maintenance computer without requiring neither to turn off the power for the information processing system 41 nor to reset the information processing system 41. FIG. 26 is a flow chart for use in describing operation when the information processing system 41 is turned on or reset. FIG. 27 is a flow chart illustrating operation in recognising the updating the basic input/output system programme during the routine of the flow chart in FIG. 26. FIG. 28 is a flow chart illustrating operation in recognising the updating the recovery programme during the routine of the flow chart in FIG. 22.

To update the basic input/output system programme, a new basic input/output system programme is supplied randomly from the separated maintenance computer in a following manner according to the routine in FIG. 24 without requiring neither to turn off the power for the information processing system 41 nor to reset the information processing system 41. At step J1, the new basic input/output system programme is supplied from the maintenance computer 60. More specifically, an operator uses a flexible disc device or the like accompanying with the maintenance computer 60. A flexible disc containing the new basic input/output system programme is mounted into the flexible disc device. The operator enter a command through a keyboard accompanying with the maintenance computer 60 to send the new basic input/output system programme to the information processing system 41. In response to this, the service processing unit 71 stores at step J2 the received new basic input/output system programme into the temporary storage area 49 of the update programme memory 48 through the interface controller 59 and the bus 76. After completion of storage, the BIOS update flag 50 in the update programme memory 48 is set at step J3. The update programme memory 48 receives a constant supply of the power from the battery 52, so that the new basic input/output system programme and the BIOS update flag 50 in the temporary storage area are retained after the information processing system 41 has been turned off.

To update the recovery programme, a new recovery programme is supplied randomly from the separated maintenance computer in a following manner according to the routine in FIG. 24 without requiring neither to turn off the power for the information processing system 41 nor to reset the information processing system 41. At step J1, the new recovery programme is supplied from the maintenance computer 60. More specifically, an operator uses a flexible disc device or the like accompanying with the maintenance computer 60. A flexible disc containing the new recovery programme is mounted into the flexible disc device. The operator enter a command through a keyboard accompanying with the maintenance computer 60 to send the new recovery programme to the information processing system 41. In response to this, the service processing unit 71 stores at step J2 the received new recovery programme into the temporary storage area 49 of the update programme memory 48 through the interface controller 59 and the bus 76. After completion of storage, the recovery programme update flag 51 in the update programme memory 48 is set at step J3. The update programme memory 48 receives a constant supply of the power from the battery 52, so that the new recovery programme and the recovery programme update flag 51 in the temporary storage area are retained after the information processing system 41 has been turned off.

Operation when the information processing system 41 is turned on or reset is described with reference to FIG. 26. At step L1, the information processing system is turned on or reset. At step L2, the BIOS memory 45 is activated. At step L3, the memory switch unit 47 monitors normal initiation of the processing with the BIOS memory 45 activated. If the BIOS memory 45 is activated normally, a checksum test is performed at step L4 on the BIOS memory 45. In other words, it is checked whether the sum of the all addresses in the BIOS memory 45 matches with a value previously calculated and stored. If the checksum test is terminated normally, step L5 is carried out to copy the contents in the BIOS memory 45 to the main memory 44. The operation is then continued on the main memory 44 (shadowing). At step L6, the main processing unit 70 communicates with the service processing unit 71 through the bus 57 and the internal interface controllers 74. In response to this, the service processing unit 71 informs the main processing unit 70 of the status of the BIOS update flag 50 and the recovery programme update flag 51. Next, at step L7, the main processing unit 30 refers the status of the BIOS update flag 50 to determine whether the updating of the basic input/output system programme is indicated. If it is indicated, the control proceeds to the basic input/output system programme update processing routine illustrated in FIG. 27. If the updating of the basic input/output system programme is not indicated, step L8 is carried out. At step L8, the main processing unit refers the status of the recovery programme update flag 51 to determine whether the updating of the recovery programme is indicated. If it is indicated, the control proceeds to the recovery programme update processing routine illustrated in FIG. 48. If the updating of the recovery programme is not indicated, step L9 is carried out to perform diagnostic processing or the like. Subsequently, the operating system is booted from the fixed magnetic disc device 54.

On the other hand, the memory switch unit 47 passes the control to the recovery memory 46 at step L10 to activate it if the monitoring unit (memory switch unit 47) detects an error or failure at step L3, or if the checksum test is terminated abnormally at step L4. Thereafter, the CPU 42 of the main processing unit 70 operates for recovery according to the recovery programme stored in the recovery memory 46. More specifically, at step L11, the main processing unit 70 communicates with the service processing unit 71 through the bus 57 and the internal interface controller 74. In response to this, the service processing unit 71 informs the main processing unit 70 of the status of the BIOS update flag 50. At step L12, the main processing unit 70 refers the status of the BIOS update flag 50 to determine whether the updating of the basic input/output system programme is indicated. If it is indicated, the control proceeds to the basic input/output system programme update processing routine illustrated in FIG. 27. In this event, the main processing unit 70 returns to step L2 after passing through the basic input/output system programme update processing routine in FIG. 27. Subsequently, the main processing unit 70 again execute startup operation at steps L2 through L9. If this processing becomes abnormal due to data error in the BIOS memory, the system is expected to be recovered automatically. If the updating of the basic input/output system programme is not indicated step L12, step L13 is then carried out. At step L13, the main processing unit 70 informs the service processing unit 71 of the error type through the bus 57 and the internal interface controller 74. In response to this, the service processing unit 71 displays the type of the existing error on the display unit 73 connected to the bus 76 or on the maintenance computer 60.

If the updating of the basic input/output system programme is indicated at step L7 or step L12, the new basic input/output system programme is written into the BIOS memory 45 in the following manner according to the routine in FIG. 27. At step M1, the new basic input/output system programme stored in the update programme memory 48 in the service processing unit 71 is written into the BIOS memory 45 through the bus 76 of the service processing unit 71, the internal interface controllers 74, and the bus 57 of the main processing unit 70. At step M2, the checksum test is performed on the BIOS memory 45. If the checksum test is terminated normally, the BIOS update flag 50 in the service processing unit 71 is reset at step M3. At step M4, the control is passed to the new basic input/output system programme in the BIOS memory 45. Then the control returns to the processing at step L2 in FIG. 26. On the other hand, if the checksum test is terminated abnormally, step M5 is carried out to determine the number of retry cycles. If a predetermined number of retry cycles is not failed, the control returns to step M1. If the predetermined number of retry cycles is failed, step M6 is carried out. At step M6, the main processing unit 70 informs the service processing unit 71 of the error type through the bus 57 and the internal interface controller 74. In response to this, the service processing unit 71 displays the type of the existing error on the display unit 73 connected to the bus 76 or on the maintenance computer 60.

Determining at step L8 in FIG. 26 that the updating of the recovery programme is updated, the main processing unit 70 writes a new recovery programme into the recovery memory 46 in the following manner according to FIG. 28. At step N1, the new recovery programme stored in the update programme memory 48 in the service processing unit 71 is written into the recovery memory 46 through the bus 76 of the service processing unit 71, the internal interface controllers 74, and the bus 57 of the main processing unit 70. At step N2, the checksum test is performed on the recovery memory 46. If the checksum test is terminated normally, the recovery programme update flag 51 in the service processing unit 71 is reset at step N3. The control then proceeds to the processing at step L9 in FIG. 26. On the other hand, if the checksum test is terminated abnormally, step N4 is carried out to determine the number of retry cycles. If a predetermined number of retry cycles is not failed, the control returns to step N1. If the predetermined number of retry cycles is failed, step N5 is carried out. At step M6, the main processing unit 70 informs the service processing unit 71 of the error type through the bus 57 and the internal interface controller 74. In response to this, the service processing unit 71 displays the type of the existing error on the display unit 73 connected to the bus 76 or on the maintenance computer 60.

Twelfth Embodiment

Figure 29:
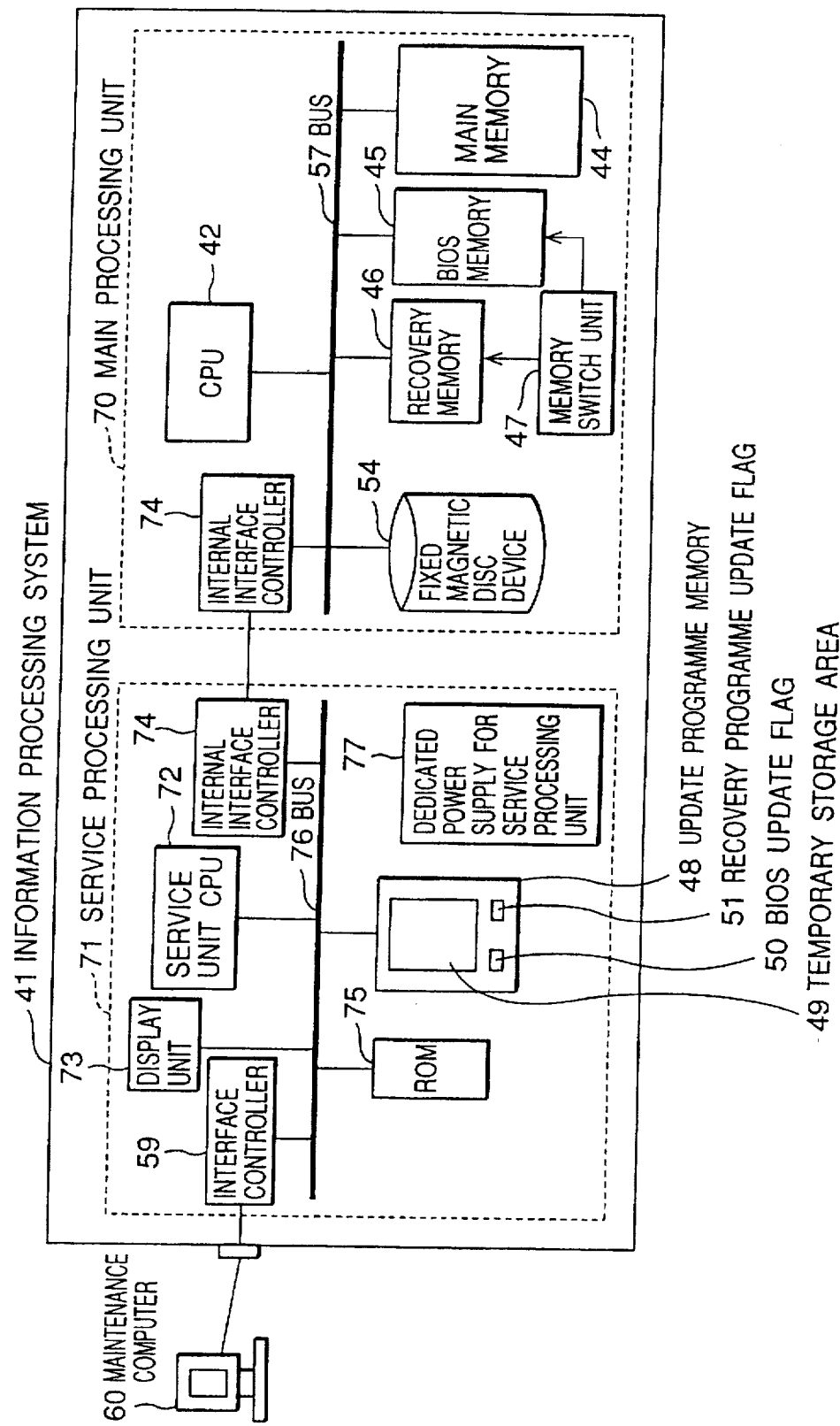
FIG. 29 is a functional block diagrams showing a structure of an information processing system according to a twelfth embodiment of the present invention.

FIG. 29 shows an information processing system according to a twelfth embodiment of the present invention. This information processing system is similar to that described in conjunction with the eleventh embodiment except that a power supply 77 is used in place of the battery 52 for the update programme memory 48. The power supply 77 is exclusive for the service processing unit and is separated from the main processing unit. According to the twelfth embodiment, it is possible to supply the new basic input/output system programme and the new recovery programme randomly even when the power supply to the main processing unit 70 is disconnected and the information processing system 41 is stopped. As a result, the basic input/output system programme can be written into the memory at any time independent of whether the information processing system is used by the user.

Thirteenth Embodiment

Figure 30:
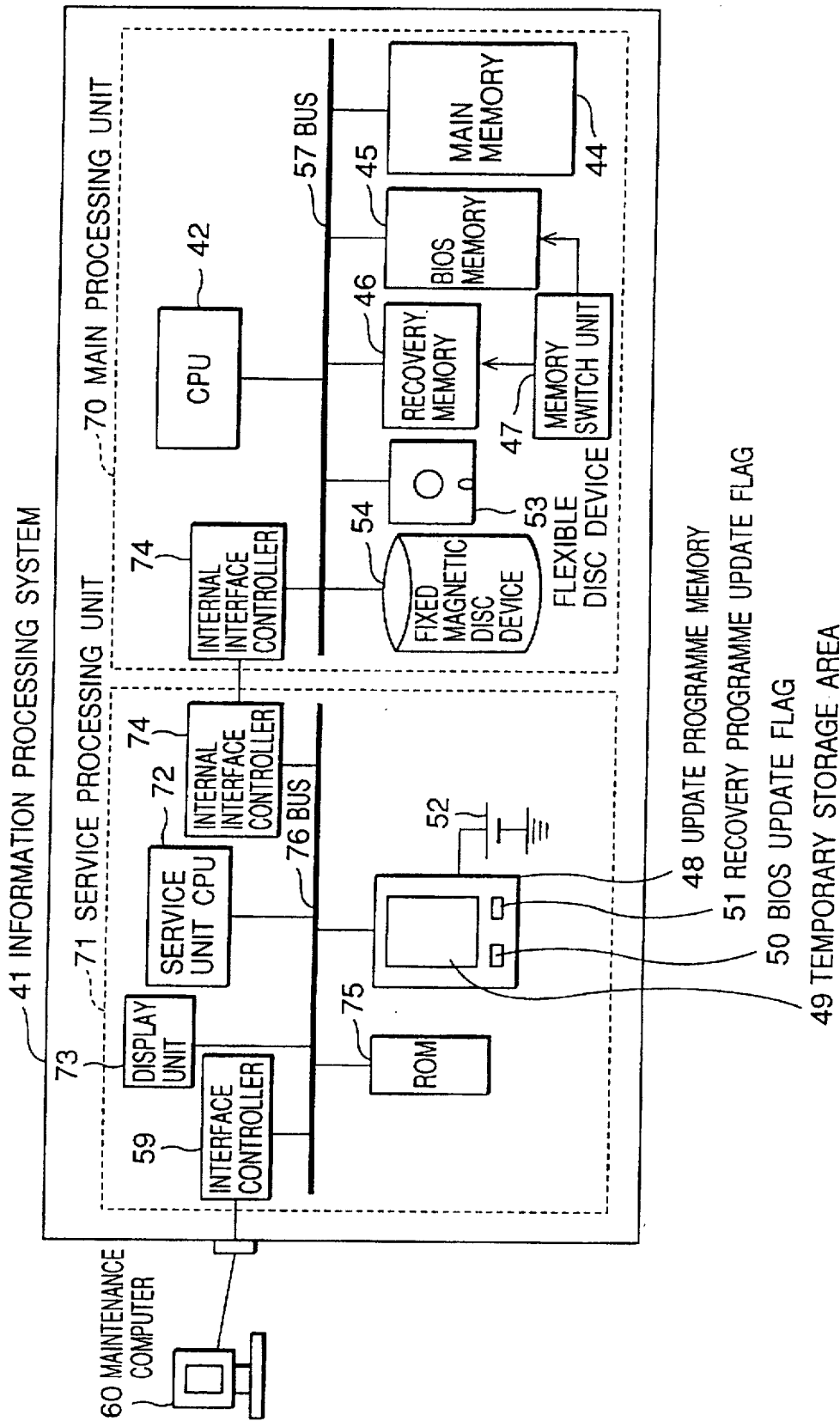
FIG. 30 is a functional block diagram showing a structure of an information processing system according to a thirteenth embodiment of the present invention.

FIG. 30 shows an information processing system according to a thirteenth embodiment of the present invention. This information processing system is similar to that described in conjunction with the eleventh embodiment except that the new basic input/output system programme and the new recovery programme are supplied to the information processing system from the flexible disc device 53 thereof rather than from the maintenance computer 60.

Fourteenth Embodiment

Figure 31:
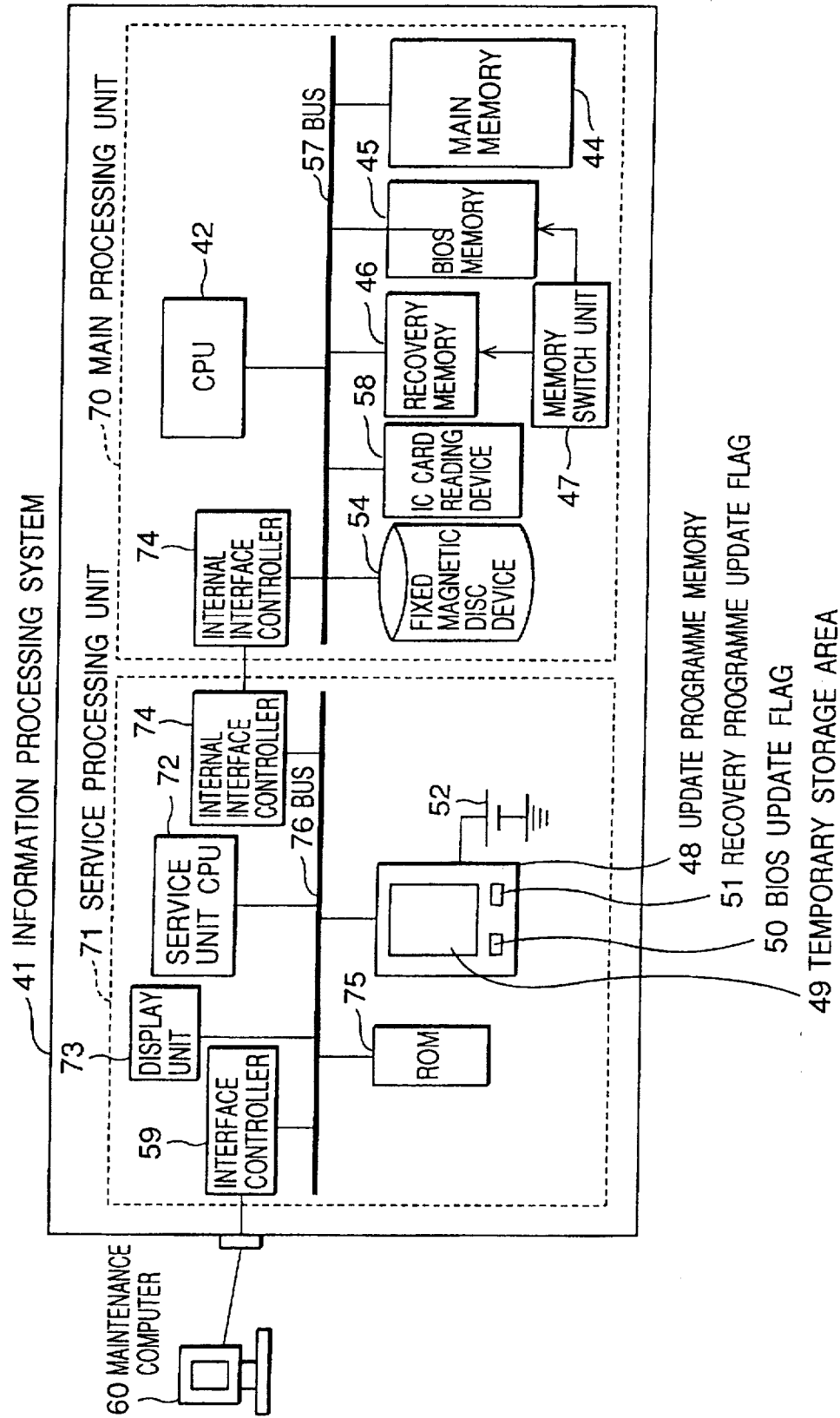
FIG. 31 is a functional block diagram showing a structure of an information processing system according to a fourteenth embodiment of the present invention.

FIG. 31 shows an information processing system according to a fourteenth embodiment of the present invention. This information processing system is similar to that described in conjunction with the eleventh embodiment except that an IC card reading device 58 and that the new basic input/output system programme and the new recovery programme are supplied to the information processing system from an IC card rather than from the maintenance computer 60.

Fifteenth Embodiment

Figure 32:
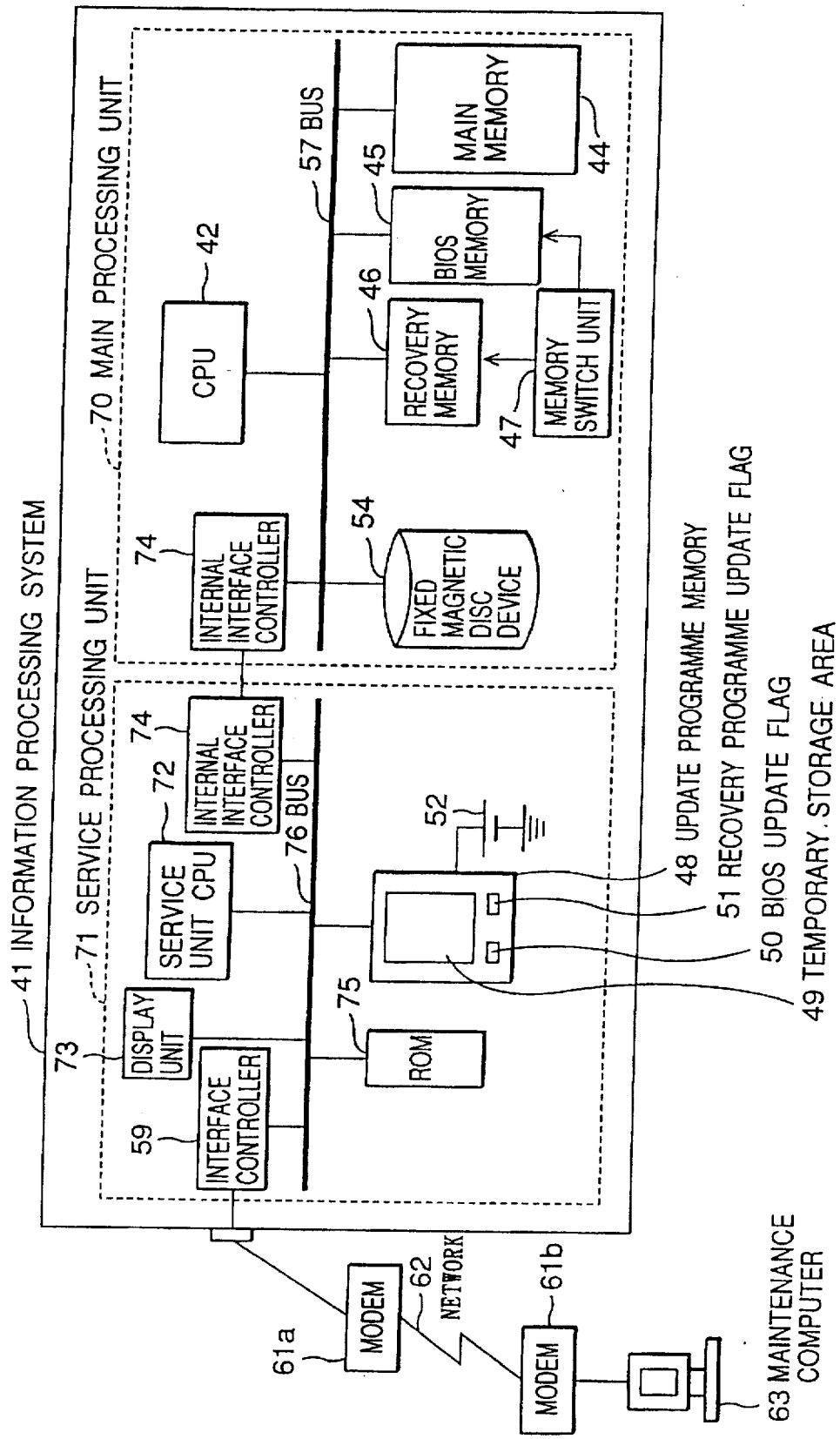
FIG. 32 is a functional block diagram showing a structure of an information processing system according to a fifteenth embodiment of the present invention.

FIG. 32 shows an information processing system according to a fifteenth embodiment of the present invention. This information processing system is similar to that described in conjunction with the eleventh embodiment except that a remote maintenance computer 63 is connected to the information processing system 41 through an interface controller 59 such as RS323C, a modem 61a, a communication network 62, and a modem 61b. The new basic input/output system programme and the new recovery programme are supplied to the information processing system 41 from the remote maintenance computer 63 rather than from the maintenance computer 60.

Sixteenth Embodiment

Figure 33:
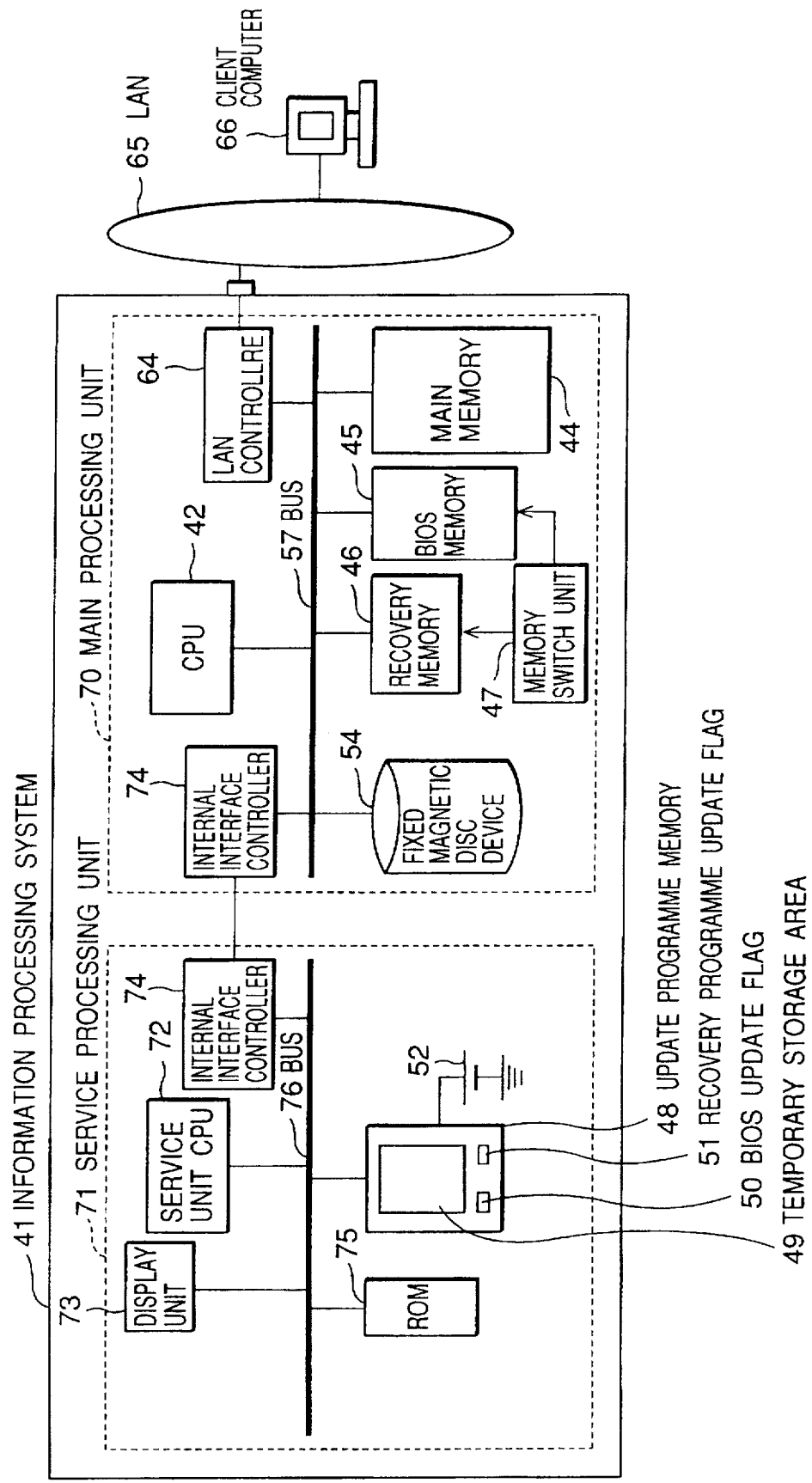
FIG. 33 is a functional block diagram showing a structure of an information processing system according to a sixteenth embodiment of the present invention.

FIG. 33 shows an information processing system according to a sixteenth embodiment of the present invention. This information processing system is similar to that described in conjunction with the eleventh embodiment except that a local area network (LAN) controller 64 is provided to communicate with LAN. The new basic input/output system programme and the new recovery programme are supplied from a client computer 66 rather than from the maintenance computer 60 to the information processing system 41 through a LAN 65 and the LAN controller 64. In this embodiment, the LAN controller is provided in the main processing unit. However, the LAN controller may be provided in the service processing unit for the same effects.

The present invention has advantages and effects as described below.

In the information processing system according to the present invention, the update basic input/output system programme is written into the update programme storing means while the operating system is in operation. In addition, the update basic input/output system programme stored in the update programme storing means is copied into the memory area used by the CPU 42 upon loading the operating system (i.e., when the information processing system 41 is turned on or is reset). Accordingly, the basic input/output system programme can be updated without the system down. If updated, the basic input/output system programme is automatically updated upon loading the system. As a result, it becomes possible to write randomly a new basic input/output system programme into the information processing system for update when the information processing system is busy to be operated by a user. This increases the working efficiency for the user.

In the information processing system, the update programme input means writes the update basic input/output system programme into the update programme storing means and sets the basic input/output system programme update flag means. Accordingly, it is unnecessary to copy the update basic input/output system programme stored in the update programme storing means upon loading the operating system (i.e., when the information processing system is turned on or is reset) until the basic input/output system programme update flag means is set. This reduces the time required for loading the system.

In the information processing system, the system loading means is not required to copy the update basic input/output system programme stored in the update programme storing means when the basic input/output system programme update flag means is reset upon loading the operating system (i.e., when the information processing system is turned on or is reset). This further reduces the time required for loading the system.

In the information processing system, the updating can be made while other application programmes are executed. Accordingly, the operator is permitted to perform the updating while doing his or her work. The working efficiency is thus further improved.

In the information processing system, the system loading means first copies the update basic input/output system programme stored in the update programme storing means to the memory (such as a flash memory) for the basic input/output system programme and then copies from the memory for the basic input/output system programme into the memory area (shadow RAM) when the basic input/output system programme update flag means is set upon loading the operating system (i.e., when the information processing system is turned on or is reset). On the other hand, the system loading means copies the basic input/output system programme stored in the memory for the basic input/output system programme into the memory area when the basic input/output system programme update flag means is reset upon loading the operating system. It is thus possible to improve the execution speed for all programmes that uses directly or indirectly the basic input/output system programme, thereby improving the working efficiency.

In the information processing system, the memory switch unit of the system loading means loads the recovery programme stored in the recovery memory (such as a flash memory) upon loading the operating system (i.e., when the information processing system is turned on or is reset) when an error is detected in the basic input/output system programme stored in the memory for the basic input/output system programme. If further operation cannot be available, the recovery programme is used to display the cause of the error for an operator. This facilitate the recovery. Accordingly, a cause of the error can be specified readily for an immediate response to recover the system.

In the information processing system, the system loading means carries out a predetermined number (such as ten) of retry cycles to copy the update basic input/output system programme from the update programme storing means to the memory for the basic input/output system programme when the basic input/output system programme update flag means is set upon loading the operating system (i.e., when the information processing system is turned on or is reset) and when an error is detected in the basic input/output system programme copied into the memory for the basic input/output system programme just after the update basic input/output system programme stored in the update programme storing means has copied into the memory for the basic input/output system programme. Accordingly, there is an effect of permitting continuation of the operation while restoring a temporal failure.

In the information processing system, the update programme input means writes a recovery programme for updating into the update programme storing means upon loading the operating system (i.e., when the information processing system is turned on or is reset) and sets the recovery programme update flag means. The system loading means copies the recovery programme for the updating stored in the update programme storing means into the recovery memory when the recovery programme update flag means is set upon loading the operating system and resets the recovery programme updating flag means. Accordingly, there is an effect that the recovery programme can be updated readily while the system is in operation, improving the working efficiency.

In the information processing system, the system loading means carries out a predetermined number (such as ten) of retry cycles to copy the update recovery programme from the update programme storing means to the recovery programme memory when the recovery programme update flag means is set upon loading the operating system (i.e., when the information processing system is turned on or is reset) and when an error is detected in the recovery programme copied into the recovery programme memory just after the update recovery programme stored in the update programme storing means has copied into the recovery programme memory. Accordingly, there is an effect of permitting continuation of the operation while restoring a temporal failure.

In the information processing system, there is an effect that the update basic input/output system programme can be written into the update programme storing means from the flexible disc mounted in the flexible disc device in response to the command supplied by the operator through the keyboard.

In the information processing system, there is an effect that the update basic input/output system programme and the recovery programme for updating can be written into the update programme storing means from the flexible disc mounted in the flexible disc device in response to the command supplied by the operator through the keyboard.

In the information processing system, there is an effect that the update basic input/output system programme can be written into the update programme storing means from the IC card inserted into the IC card reading device in response to the command supplied by the operator through the keyboard.

In the information processing system, there is an effect that the update basic input/output system programme and the recovery programme for updating can be written into the update programme storing means from the IC card inserted into the IC card reading device in response to the command supplied by the operator through the keyboard.

In the information processing system, the update programme input means writes the update basic input/output system programme into the second common memory, resets the first valid flag, and sets the second valid flag when the first valid flag is set and the second valid flag is reset while the operating system in operation. On the other hand, the update programme input means writes the update basic input/output system programme into the first common memory, sets the first valid flag, and resets the second valid flag when the first valid flag is reset and the second valid flag is set while the operating system in operation. The system loading means copies the basic input/output system programme stored in the first common memory into the memory area of the main memory when the first valid flag is set and the second valid flag is reset upon loading the operating system (i.e., when the information processing system is turned on or is reset). On the other hand, the system loading means copies the basic input/output system programme stored in the second common memory into the memory area of the main memory when the first valid flag is reset and the second valid flag is set upon loading the operating system.

As a result, the first and the second common memories store new basic input/output system programmes. Upon loading the operating system (i.e., when the information processing system is turned on or is reset), the new basic input/output system programme is shadowed on the main memory. Accordingly, it becomes possible to update the basic input/output system programme readily and hence to improve the execution speed for all programmes that uses directly or indirectly the basic input/output system programme, thereby improving the working efficiency.

In the information processing system, the first and the second common memories store the recovery programme for use in performing recovery processing when an error is detected in the first and the second common memories. The update programme input means writes into the second common memory the recovery programme for updating along with the update basic input/output system programme when the first valid flag is set and the second valid flag is reset upon loading the operating system (i.e., when the information processing system is turned on or is reset). On the other hand, the update programme input means writes into the first common memory the recovery programme for updating along with the update basic input/output system programme when the first valid flag is reset and the second valid flag is set while the operating system is in operation. The system loading means loads the recovery programme stored in the second common memory when the first valid flag is set and the second flag is reset and when an error is detected in the first common memory while the operating system is in operation. On the other hand, the system loading means loads the recovery programme stored in the first common memory when the first valid flag is reset and the second flag is set and when an error is detected in the first common memory while the operating system is in operation.

Accordingly, the first and the second common memories alternatively store the new recovery programme along with the basic input/output system programme. If an error is found in the common memory upon loading the operating system (i.e., when the information processing system is turned on or is reset), the recovery programme in the other common memory is loaded. If further operation cannot be available, the recovery programme is used to display the cause of the error for the operator. This facilitate recovery. As a result, it becomes possible to update the recovery programme effectively. If an error is caused upon loading the system, the cause of the error can be specified immediately for the necessary processing of recovery.

In the information processing system, the update programme input means performs a predetermined number (such as ten) of retry cycles to write into the second common memory the update basic input/output -system programme or the recovery programme for updating when the first valid flag is set and the second valid flag is reset and when an error is detected in the update basic input/output system programme or the recovery programme written in the second common memory. On the other hand, the update programme input means performs a predetermined number (such as ten) of retry cycles to write into the first common memory the update basic input/output system programme or the recovery programme for updating when the first valid flag is reset and the second valid flag is set and when an error is detected in the update basic input/output system programme or the recovery programme written in the first common memory. Accordingly, there is an effect of permitting continuation of the operation while restoring a temporal failure.

In the information processing system, there is an effect that the update basic input/output system programme and the recovery programme for updating can be written into either the first common memory or the second common memory from the flexible disc mounted in the flexible disc device in response to the command supplied by the operator through the keyboard.

In the information processing system, there is an effect that the update basic input/output system programme and the recovery programme for updating can be written into either the first common memory or the second common memory from the IC card inserted into the IC card reading device in response to the command supplied by the operator through the keyboard.

In the information processing system, the update basic input/output system programme and the recovery programme for updating that are received from the external computer (a maintenance computer, a remote maintenance computer, or a client computer) through the connection unit (an interface controller, or a LAN controller) can be written into either the first common memory or the second common memory.

In the information processing system, the update programme storing means formed of a static RAM or the like is provided in the service processing unit having an independent CPU and bus. Accordingly, the operation to update the programme(s) can be made independently of the operation carried out by the main processing unit through, for example, the maintenance computer or a maintenance terminal.

In the information processing system, the update programme input means writes the update basic input/output system programme into the update programme storing means and sets the basic input/output system programme update flag means. Accordingly, it is unnecessary to copy the update basic input/output system programme stored in the update programme storing means upon loading the operating system (i.e., when the information processing system is turned on or is reset) until the basic input/output system programme update flag means is set. This reduces the time required for loading the system.

In the information processing system, the system loading means is not required to copy into the memory area of the main memory the update basic input/output system programme stored in the update programme storing means when the basic input/output system programme update flag means is set upon loading the operating system (i.e., when the information processing system is turned on or is reset). This further reduces the time required for loading the system.

In the information processing system, the memory switch unit of the system loading means loads the recovery programme stored in the recovery memory (such as a flash memory) upon loading the operating system (i.e., when the information processing system is turned on or is reset) when an error is detected in the basic input/output system programme stored in the memory for the basic input/output system programme. Accordingly, it is possible to display the cause of the error for an operator. In addition, a cause of the error can be specified readily for an immediate response to recover the system.

In the information processing system, the system loading means carries out a predetermined number (such as ten) of retry cycles to copy the update basic input/output system programme from the update programme storing means to the memory for the basic input/output system programme when the basic input/output system programme update flag means is set upon loading the operating system (i.e., when the information processing system is turned on or is reset) and when an error is detected in the basic input/output system programme copied into the memory for the basic input/output system programme just after the update basic input/output system programme stored in the update programme storing means has copied into the memory for the basic input/output system programme. Accordingly, there is an effect of permitting continuation of the operation while restoring a temporal failure.

In the information processing system, the update programme input means writes a recovery programme for updating into the update programme storing means and sets the recovery programme update flag means. The system loading means copies the recovery programme for the updating stored in the update programme storing means into the recovery memory when the recovery programme update flag means is set upon loading the operating system (i.e., when the information processing system is turned on or is reset) and resets the recovery programme updating flag means. Accordingly, there is an effect that the recovery programme can be updated effectively.

In the information processing system, the system loading means carries out a predetermined number (such as ten) of retry cycles to copy the update recovery programme from the update programme storing means to the recovery programme memory when the recovery programme update flag means is set upon loading the operating system (i.e., when the information processing system is turned on or is reset) and when an error is detected in the recovery programme copied into the recovery programme memory just after the update recovery programme stored in the update programme storing means has copied into the recovery programme memory. Accordingly, there is an effect of permitting continuation of the operation while restoring a temporal failure.

In the information processing system, the update programmes are supplied to and stored in a volatile memory which retains the contents stored therein as long as there is enough power supplied from a battery. Accordingly, it is possible to write the update programme into the memory at a high speed, ensuring the written update programmes retained therein.

In the information processing system, the power supply for the service processing unit supplies power when the power supply for the main processing unit is disconnected and the update programme storing means is applied with power by the power supply for the service processing unit. Accordingly, the contents in the update programme storing means, i.e., the update programme, can be retained by the power supply in the service processing unit after the information processing system has been turned off.

In the information processing system, the update basic input/output system programme received from the external computer (a maintenance computer, a remote maintenance computer, or a client computer) through the connection unit (an interface controller, or a LAN controller) can be written into the update programme storing means.

In the information processing system, there is an effect that the update basic input/output system programme can be written into either the first common memory or the second common memory from the flexible disc mounted in the flexible disc device in response to the command supplied by the operator through the keyboard.

In the information processing system, there is an effect that the update basic input/output system programme can be written into either the first common memory or the second common memory from the IC card inserted into the IC card reading device in response to the command supplied by the operator through the keyboard.

In the information processing system, the update basic input/output system programme and the recovery programme for updating that are received from the external computer (a maintenance computer, a remote maintenance computer, or a client computer) through the connection unit (an interface controller, or a LAN controller) can be written into either the first common memory or the second common memory.

In the information processing system, there is an effect that the update basic input/output system programme and the recovery programme for updating can be written into either the first common memory or the second common memory from the flexible disc mounted in the flexible disc device in response to the command supplied by the operator through the keyboard.

In the information processing system, there is an effect that the update basic input/output system programme and the recovery programme for updating can be written into either the first common memory or the second common memory from the IC card inserted into the IC card reading device in response to the command supplied by the operator through the keyboard.

It should be understood that the present invention is not limited to the particular embodiment shown and described above, and various changes and modifications may be made without departing from the spirit and scope of the appended claims.

What is claimed is:

1. An information processing system comprising a central processing unit, a main memory for storing instructions and data, a basic input/output system programme that works with the hardware, and an operating system for use in providing a logical interface to an application programme with the basic input/output system programme, comprising:

a non-volatile memory holding the basic input/output system programme, the information processing system loading the basic input-output system programme from the non-volatile memory except upon failure, thereof;

update programme storing means which retains the content stored therein after the power supply to the information processing system has been turned off the update programme storing means holding an update basic input/output system programme;

system loading means for use in copying the update basic input/output system programme stored in said update programme storing means to a memory area of the main memory upon loading the operating system;

a recovery memory holding a recovery copy of the basic input/output system programme, the recovery copy loaded by the system loading means into main memory when the non-volatile memory fails; and update programme input means for use in supplying the update basic input/output system programme to said update programme storing means to write the programme thereinto while the operating system is in operation.

2. An information processing system as claimed in claim 1 characterised by further comprising:

basic input/output system programme update flag means indicative of presence and absence of the basic input/output system programme, the basic input/output system programme update flag means being retained after the power supply to the information processing system has been turned off, said update programme input means writes the update basic input/output system programme into said update programme storing means and sets the basic input/output system programme update flag means.

3. An information processing system as claimed in claim 2 characterised in that:

said system loading means copies the update basic input/output system programme stored in said update programme storing means to the memory area of the main memory and resets the basic input/output system programme update flag means when the basic input/output system programme update flag means is set upon loading the operating system.

4. An information processing system as claimed in claim 3, wherein said system loading means copies the update basic input/output system programme stored in said update programme storing means first to said memory for the basic input/output system programme and then copies from said memory for the basic input/output system programme into the memory area when the basic input/output system programme update flag means is set upon loading the operating system, said system loading means copies the basic input/output system programme stored in said memory for the basic input/output system programme into the memory area when the basic input/output system programme update flag means is reset upon loading the operating system.

5. An information processing system as claimed in claim 4, said system loading means comprising:

a memory switch unit for use in loading the recovery programme stored in said recovery memory upon loading the operating system when an error is detected in the basic input/output system programme stored in said memory for the basic input/output system programme.

6. An information processing system as claimed in claim 5 characterised in that:

said system loading means carries out a predetermined number of retry cycles to copy the update basic input/output system programme from said update programme storing means to said memory for the basic input/output system programme when the basic input/output system programme update flag means is set upon loading the operating system and when an error is detected in the basic input/output system programme copied into said memory for the basic input/output system programme just after the update basic input/output system programme stored in said update programme storing means has copied into said memory for the basic input/output system programme.

7. An information processing system as claimed in claim 5 characterised by further comprising:

recovery programme update flag means indicative of presence and absence of updating of the recovery programme, the recovery programme update flag means being retained after the power supply to the information processing system has been turned off, said update programme input means comprising means for writing a recovery programme for updating into said update programme storing means while the operating system is in operation and for setting the recovery programme update flag means, said system loading means copying the recovery programme for the updating stored in said update programme storing means into said recovery memory when the recovery programme update flag means is set upon loading the operating system and for resetting the recovery programme updating flag means.

8. An information processing system as claimed in claim 7 characterised in that:

said system loading means carries out a predetermined number of retry cycles to copy the update recovery programme from said update programme storing means to said recovery programme memory when the recovery programme update flag means is set upon loading the operating system and when an error is detected in the recovery programme copied into said recovery programme memory just after the update recovery programme stored in said update programme storing means has copied into said recovery programme memory.

9. An information processing system as claimed in claim 7 characterised in that:

said update programme input means comprises a flexible disc device into which a flexible disc is mounted that contains the update basic input/output system programme and the recovery programme for updating, and a keyboard through which an operator enter a command, the update basic input/output system programme and the recovery programme for updating are written into said update programme storing means from the flexible disc mounted in the flexible disc device in response to the command supplied by the operator through the keyboard.

10. An information processing system as claimed in claim 7 characterised in that:

said update programme input means comprises an IC card reading device into which an IC card is inserted that contains the update basic input/output system programme and the recovery programme for updating, and a keyboard through which an operator enter a command, the update basic input/output system programme and the recovery programme for updating are written into said update programme storing means from the IC card inserted into the IC card reading device in response to the command supplied by the operator through the keyboard.

11. An information processing system as claimed in claim 3 characterised by further comprising:

a first common memory for use in storing the basic input/output system programme, the first common memory being formed of a storage area of a first non-volatile memory of which contents can be rewritten on a board;

a second common memory for use in storing the basic input/output system programme, the second common memory being formed of a storage area of a second non-volatile memory of which contents can be rewritten on a board;

a first valid flag formed of a part of the first non-volatile memory; and a second valid flag formed of a part of the second non-volatile memory, said update programme input means writing the update basic input/output system programme into said second common memory, resetting said first valid flag, and setting said second valid flag when said first valid flag is set and said second valid flag is reset while the operating system in operation, and said update programme input means writing the update basic input/ output system programme into said first common memory, setting said first valid flag, and resetting said second valid flag when said first valid flag is reset and said second valid flag is set while the operating system in operation, said system loading means copying the basic input/output system programme stored in said first common memory into the memory area of the main memory when said first valid flag is set and said second valid flag is reset upon loading the operating system, and said system loading means copying the basic input/output system programme stored in said second common memory into the memory area of the main memory when said first valid flag is reset and said second valid flag is set upon loading the operating system, said update programme storing means consisting of the storage areas of said first memory and said second memory, the basic input/output system programme update flag means consisting of said first valid flag and said second valid flag.

12. An information processing system as claimed in claim 11 characterised in that:

said first and said second common memories store the recovery programme for use in performing recovery processing when an error is detected in said first and said second common memories, said update programme input means writing into said second common memory the recovery programme for updating along with the update basic input/output system programme when said first valid flag is set and said second valid flag is reset while the operating system is in operation, and said update programme input means writing into said first common memory the recovery programme for updating along with the update basic input/output system programme when said first valid flag is reset and said second valid flag is set while the operating system is in operation, said system loading means loading the recovery programme stored in said second common memory when said first valid flag is set and said second flag is reset and when an error is detected in said first common memory while the operating system is in operation, and said system loading means loading the recovery programme stored in said first common memory when said first valid flag is reset and said second flag is set and when an error is detected in said first common memory while the operating system is in operation.

13. An information processing system as claimed in claim 12 characterised in that:

said update programme input means performing a predetermined number of retry cycles to write into said second common memory the update basic input/output system programme or the recovery programme for updating when said first valid flag is set and said second valid flag is reset and when an error is detected in the update basic input/output system programme or the recovery programme written in said second common memory, and said update programme input means performing a predetermined number of retry cycles to write into said first common memory the update basic input/output system programme or the recovery programme for updating when said first valid flag is reset and said second valid flag is set and when an error is detected in the update basic input/output system programme or the recovery programme written in said first common memory.

14. An information processing system as claimed in claim 12 or 13 characterised in that:

said update programme input means comprises a flexible disc device into which a flexible disc is mounted that contains the update basic input/output system programme and the recovery programme for updating, and a keyboard through which an operator enter a command, the update basic input/output system programme and the recovery programme for updating are written into either said first common memory or said second common memory from the flexible disc mounted in the flexible disc device in response to the command supplied by the operator through the keyboard.

15. An information processing system as claimed in claim 12 or 13 characterised in that:

said update programme input means comprises an IC card reading device into which an IC card is inserted that contains the update basic input/output system programme and the recovery programme for updating, and a keyboard through which an operator enter a command, the update basic input/output system programme and the recovery programme for updating are written into either said first common memory or said second common memory from the IC card inserted into the IC card reading device in response to the command supplied by the operator through the keyboard.

16. An information processing system as claimed in claim 12 or 13 characterised in that:

said update programme input means comprises a connecting unit and an external computer connected to the connecting unit to write into either said first common memory or said second common memory the update basic input/output system programme and the recovery programme for updating that are received from the external computer through the connection unit.

17. An information processing system as claimed in claim 1 characterised in that:

said update programme input means comprises a flexible disc device into which a flexible disc is mounted that contains the update basic input/output system programme, and a keyboard through which an operator enter a command, the update basic input/output system programme is written into said update programme storing means from the flexible disc mounted in the flexible disc device in response to the command supplied by the operator through the keyboard.

18. An information processing system as claimed in claim 1 characterised in that:

said update programme input means comprises an IC card reading device into which an IC card is inserted that contains the update basic input/output system programme, and a keyboard through which an operator enter a command, the update basic input/output system programme is written into said update programme storing means from the IC card inserted into the IC card reading device in response to the command supplied by the operator through the keyboard.

19. An information processing system characterised by comprising:

a main processing unit comprising a central processing unit, a main memory for storing instructions and data, a main processing unit bus for use in connecting the central processing unit and the main memory, a basic input/output system programme that work with the hardware, a basic input/output system programme that work with the hardware, a basic input/output system programme memory for use in storing the basic input/output system programme, the basic input/output system programme memory being formed of a non-volatile memory of which contents can be rewritten on a board and being connected to the central processing unit through the main processing unit bus, a recovery memory holding a recovery copy of the basic input/output system programme, system loading means for use in copying the update basic input/output system programme stored in said update programme storing means to a memory area of the main memory upon loading the operating system and the recovery copy loaded by the system loading means into main memory when the non-volatile memory fails,;

a service processing unit comprising a central processing unit for said service processing unit, a service processing unit bus, a service processing unit system programme, and update programme storing means connected to the central processing unit for the service processing unit through the service processing unit bus, the update programme storing means retaining the contents stored therein after the power supply to the information processing system has been turned off, the update programme storing means holding an update basic input/output system programme; and update programme input means for use in supplying an update basic input/output system programme to said update programme storing means to write the programme thereinto while the operating system is in operation;

said system loading means copying first the update basic input/output system programme stored in said update programme storing means into the basic input/output system programme memory and then copying the update basic input/output system programme from the basic input/output system programme memory to the memory area.

20. An information processing system as claimed in claim 19 characterised in that:

said service processing unit further comprises basic input/output system programme update flag means indicative of presence and absence of updating of the basic input/output system programme, the basic input/output system programme update flag means being connected to the central processing unit for said service processing unit through the service processing unit bus, and being retained after the power supply to the information processing system has been turned off, said update programme input means writing the update basic input/output system programme into said update programme storing means and setting the basic input/output system programme update flag means.

21. An information processing system as claimed in claim 20 characterised in that:

system loading means carries out a predetermined number of retry cycles to copy the update basic input/output system programme from said update programme storing means to said memory for the basic input/output system programme when the basic input/output system programme update flag means is set upon loading the operating system and when an error is detected in the basic input/output system programme copied into said memory for the basic input/output system programme just after the update basic input/output system programme stored in said update programme storing means has copied into said memory for the basic input/output system programme.

22. An information processing system as claimed in claim 19 characterised in that:

said system loading means copies the update basic input/output system programme stored in said update programme storing means to the memory area of the main memory and resets the basic input/output system programme update flag means when the basic input/output system programme update flag means is set upon loading the operating system.

23. An information processing system as claimed in claim 22 characterised in that:

said service processing unit further comprises recovery programme update flag means which is connected to the central processing unit for said service processing unit through the service processing unit bus and which is indicative of presence and absence of updating of the recovery programme, the recovery programme update flag means being retained after the power supply to the information processing system has been turned off, said update programme input means comprising means for writing a recovery programme for updating into said update programme storing means and for setting the recovery programme update flag means, said system loading means copying the recovery programme for the updating stored in said update programme storing means into said recovery memory when the recovery programme update flag means is set upon loading the operating system and for resetting the recovery programme updating flag means.

24. An information processing system as claimed in claim 23 characterised in that:

said system loading means carries out a predetermined number of retry cycles to copy the update recovery programme from said update programme storing means to said recovery programme memory when the recovery programme update flag means is set upon loading the operating system and when an error is detected in the recovery programme copied into said recovery programme memory just after the update recovery programme stored in said update programme storing means has copied into said recovery programme memory.

25. An information processing system as claimed in claim 1 or claim 23 characterised in that:

said update programme input means comprises a connecting unit connected to the central processing unit for said service processing unit through the service processing unit bus, and an external computer connected to the connecting unit to write into said update programme storing means the update basic input/output system programme and the received programme for updating that are received from the external computer through the connection unit.

26. An information processing system as claimed in claim 23 characterised in that:

said update programme input means comprises a flexible disc device into which a flexible disc is mounted that contains the update basic input/output system programme and the recovery programme for updating, and a keyboard through which an operator enter a command, the update basic input/output system programme and the recovery programme for updating are written into said update programme storing means from the flexible disc mounted in the flexible disc device in response to the command supplied by the operator through the keyboard.

27. An information processing system as claimed in claim 23 characterised in that:

said update programme input means comprises an IC card reading device into which an IC card is inserted that contains the update basic input/output system programme and the recovery programme for updating, and a keyboard through which an operator enter a command, the update basic input/output system programme and the recovery programme for updating are written into said update programme storing means from the IC card inserted into the IC card reading device in response to the command supplied by the operator through the keyboard.

28. An information processing system as claimed in claims 19 characterised in that:

said main processing unit further comprises a recovery memory formed of a non-volatile memory of which contents can be rewritten on a board, the recovery memory being connected to the central processing unit through the main processing unit bus for storing a recovery programme that is used for recovery processing when an error is detected in the basic input/output system programme stored in said memory for the basic input/output system programme, said system loading means comprising a memory switch unit for use in loading the recovery programme stored in said recovery memory upon loading the operating system when an error is detected in the basic input/output system programme stored in said memory for the basic input/output system programme.

29. An information processing system as claimed in claim 1 or claim 19 characterised in that:

said update programme storing means is formed of a volatile memory which retains the contents stored therein as long as there is enough power supplied from a battery.

30. An information processing system as claimed in claim 19 characterised in that:

said service processing unit comprises a power supply for said service processing unit which is separated from a power supply for said main processing unit, the power supply for said service processing unit supplying power when the power supply for said main processing unit is disconnected, said update programme storing means being applied with power by the power supply for said service processing unit.

31. An information processing system as claimed in claim 1 or claim 19 characterised in that:

said update programme input means comprises a connecting unit connected to the central processing unit for said service processing unit through the service processing unit bus, and an external computer connected to the connecting unit to write into said update programme storing means the update basic input/output system programme received from the external computer through the connection unit.

32. An information processing system as claimed in claim 19 characterised in that:

said update programme input means comprises a flexible disc device into which a flexible disc is mounted that contains the update basic input/output system programme, and a keyboard through which an operator enter a command, the update basic input/output system programme is written into said update programme storing means from the flexible disc mounted in the flexible disc device in response to the command supplied by the operator through the keyboard.

33. An information processing system as claimed in claim 19 characterised in that:

said update programme input means comprises an IC card reading device into which an IC card is inserted that contains the update basic input/output system programme, and a keyboard through which an operator enter a command, the update basic input/output system programme is written into said update programme storing means from the IC card inserted into the IC card reading device in response to the command supplied by the operator through the keyboard.

* * * * *